United States Patent [19]
Friend

[11] Patent Number: 5,652,806
[45] Date of Patent: Jul. 29, 1997

[54] INPUT DEVICE WITH DATA TARGETING TO DETERMINE AN ENTRY FIELD FOR A BLOCK OF STROKE DATA

[75] Inventor: John Friend, Pleasanton, Calif.

[73] Assignee: Compaq Computer Corporation, Houston, Tex.

[21] Appl. No.: 561,978

[22] Filed: Nov. 21, 1995

Related U.S. Application Data

[63] Continuation of Ser. No. 819,450, Jan. 10, 1992, abandoned.

[51] Int. Cl.⁶ .................................................. G06K 9/34
[52] U.S. Cl. .................................................... 382/175
[58] Field of Search ...................................... 382/175, 177, 382/179, 186, 187, 189, 202, 292

[56] References Cited

U.S. PATENT DOCUMENTS

| | | | |
|---|---|---|---|
| 4,475,239 | 10/1984 | van Raamsdonk | 382/57 |
| 4,562,304 | 12/1985 | Ward et al. | 178/18 |
| 4,654,873 | 3/1987 | Fujisawa et al. | 382/9 |
| 4,656,317 | 4/1987 | Tsugei et al. | 178/18 |
| 4,677,585 | 6/1987 | Ikegami et al. | 364/900 |
| 4,727,588 | 2/1988 | Fox et al. | 382/13 |
| 4,817,034 | 3/1989 | Hardin, Sr. et al. | 364/900 |
| 4,947,156 | 8/1990 | Sato et al. | 340/707 |
| 4,972,496 | 11/1990 | Sklarew | 382/13 |
| 5,276,794 | 1/1994 | Lamb, Jr. | 395/149 |
| 5,455,901 | 10/1995 | Friend et al. | 395/149 |

FOREIGN PATENT DOCUMENTS

| | | | |
|---|---|---|---|
| 377129 | 7/1990 | European Pat. Off. | 382/13 |
| 58-207180 | 12/1983 | Japan | 382/9 |
| 1-265377 | 10/1989 | Japan | 382/179 |
| 2-29885 | 1/1990 | Japan | 382/9 |

*Primary Examiner*—Andrew Johns
*Attorney, Agent, or Firm*—Fish & Neave; Jeffrey H. Ingerman; Matthew T. Byrne

[57] ABSTRACT

The present invention provides an improved method for targeting in a computer system. A block of data is identified by analyzing strokes of writing to determine if a current stroke is to be associated with an existing block of data or with a new block of data. Displacement in the X direction and Y direction between a prior stroke and a current stroke is generated and analyzed to determine if a new block of data has been created. After a block of data has been identified, the bounds of the smallest rectangle that contains all of the strokes in the block are determined. The area overlap between the bounded rectangle and every object or field touched by the rectangle is calculated. If a preselected threshold percentage of the bounded rectangle overlaps a single field or object, that field or object is identified as the target. If no one field or object is overlapped by at least the preselected percentage area of the bounded rectangle, bounding rectangles are defined for each character or stroke in the block of data. The amount of overlap of the bounded characters is determined, and the field having the greatest area of overlap is identified as the target field.

47 Claims, 10 Drawing Sheets

INPUT DEVICE WITH DATA TARGETING TO DETERMINE AN ENTRY FIELD FOR A BLOCK OF STROKE DATA

CROSS REFERENCE TO RELATED APPLICATION

This is a continuation of commonly assigned U.S. patent application Ser. No. 07/819,450, filed Jan. 10, 1992, now abandoned.

BACKGROUND OF THE INVENTION

1. Field of the Invention

The present invention relates to the field of data entry in computer systems.

2. Background Art

A typical computer system consists of a central processing unit (CPU), main memory such as random access memory (RAM), a data entry device, including a positioning device, a mass storage device such as one or more disk drives, a display and/or a printer. In the prior art, the data entry device often consists of a keyboard, on which a user enters data by typing. The positioning device of a prior art computer system may consist of a "mouse" or other cursor positioning device.

Computer systems have also been developed that are directed to handwritten data entry rather than keyboard data entry. These systems are often characterized by the use of a pen, stylus, or other writing device, to enter handwritten data directly on the display of the computer system. Alternatively, these systems may provide for a user to enter data on a digitizing tablet or other input device, with the image of the written input displayed on a separate computer display output device. The writing device for entering handwritten or freestyle stroke input information is not limited to a pen or stylus, but may be any input device such as a mouse, trackball, pointer, or even a person's fingers. Such systems are not necessarily limited to receiving data generated by human users; for example, machine generated data may also be inputted and accepted to such systems.

One class of this handwriting entry computer system that receives handwritten data input is referred to as "pen based" computers. In a pen based computer system, a writer can input information on a display by "writing" directly on the display. A writing device, such as a pen or stylus, is used to enter information on the display. In a typical pen-based computer system, a user touches the stylus to the display and writes as he would on a piece of paper, by making a series of pen strokes to form letters and words. A line appears on the display that follows the path of travel of the pen point, so that the pen strokes appear on the display as ink would appear on a handwritten page. Thus, the user can enter information into the computer by writing on the display. In addition to handwriting, special functions based on input strokes are supported on pen based computer systems. For example, a writer may strike certain previously entered handwritten input by making the strokes of an "X" over the entry. These special functional strokes or actions are referred to herein as "gestures". Pen based computers typically have a display surface that serves as both an input receiving device and as an output display device.

One problem in a handwriting entry computer system is determining the beginning and ends of characters and words. This process is referred to as "splitting." Some prior art systems rely on the proximity of a pen or stylus to the display or entry means as a cue to indicate the beginning and ends of characters and/or words. However, users may not always lift the pen out of proximity from the display or entry means when writing a new character or new word. Incorrect splitting decisions can lead to errors in display of handwritten or translated text since separations between words and characters may not be recognized.

The display of a pen-based entry or other handwriting entry computer system may have bordered regions called "fields" that define locations or areas where data is to be entered, or that are associated with particular actions. For example, if the software application provides a data entry display that is an information form with fields for "First Name", "Last Name", "Age", "Occupation", etc., certain information is generally associated with each field. These locations are referred to here as "objects" or "fields". Each object has a boundary associated with it. When data is entered, the computer must determine which object is to be associated with the writing or gesture. The object intended to be associated with the data input is called the target object. The process of identifying the target object is referred to here as targeting. The method and apparatus that performs the function of targeting is referred to here as a targeting system.

It is the nature of handwriting that the writer often will write strokes or characters outside of defined boundaries of objects or fields. Where the target object is relatively small compared to typical handwriting paper guidelines, for example, the writer will typically find it difficult to stay within the lines when writing into that object. Resultant writing strokes may fall partly within the boundaries of the target object and partly in areas of the display that are outside of the boundaries of the target object and/or in areas that do not contain any objects. In addition, writing strokes may fall partly within the boundaries of objects adjacent to the target object.

There are a number of prior art schemes for targeting. These prior art targeting schemes will typically provide incorrect targeting decisions when applied to handwritten input. A common characteristic of these prior art schemes is that targeting decisions about the target field are made at the beginning of the writing operation, for example, at the time of initial contact of the writing entry device with the display or input device. These prior art schemes typically result in a substantially degraded targeting decision.

In the following description, the prior art schemes will be described in connection with a handwriting data entry computer system that uses a pen or stylus as the data entry device and where data is entered by writing directly on the display. This is for purposes of example only, and is not intended to limit the description.

In one prior art targeting scheme, the target is defined as the object touched by the pen upon initial contact. Thus, in this prior art scheme, the target object is the object, (if any), that is associated with the point of initial contact of the stylus, pen or analogous input device. This scheme is described in connection with the examples of FIGS. 1 and 2.

FIG. 1 illustrates an example of a writing entry computer system that includes a housing 101, a display 102 and a writing tool, or "pen" 103. The display 102, for example, shows as display output, the outline of a form for data entry. This form can be generated, for example, by an application program running on the pen based computer system. The form may include a number of objects or fields. For example, in the example of FIG. 1, the form includes the "First Name" field 104, the "Last Name" field 105, the "Company" field 106 and the "Date" field 107.

In this example, fields 104–107 are arranged such that the lower boundary of one field is coincident with the upper boundary of the adjacent field. As a result, if a user entering data in one field writes outside the boundaries of that field, the stray writing may fall within the boundaries of another adjacent field. Consider the example of entering the name "Tom" in the "First Name" field 104, the name "Jones" in the "Last Name" field 105, and the name "International" in the "Company" field 106. When an entry begins with a capital letter such as "T", "J", or "I", it has been found that a user is likely to begin the pen stroke that defines the letter "J" near the top of the target field. The first stroke of the letter will be entered by the user beginning in the field above the target field, or by beginning the first stroke entirely outside any field, as shown in the examples of FIG. 1.

For example, in FIG. 1, the top stroke of the letter "T" of the name "Tom" in field 104 extends outside of the boundaries of field 104 and a portion of the top stroke of the letter "T" is not located within the boundaries of any field. The letter "J" of the name "Jones" in field 105 has a portion of its top stroke that is not within the boundaries of any field. The top stroke of the letter "J" crosses a corner of field 104 before extending into field 105. The "I" of the name "International" is found partially within the boundaries of field 105 and extends within the boundaries of field 106.

It has been found that the letter "T" is typically written with two strokes, a horizontal "cap" stroke, and a vertical stroke. The letter "J" is also typically written with two strokes, namely a horizontal stroke for the top or cap of the "J", and a curved stroke for the bottom hook of the letter "J". The letter "I" is can be written with a single vertical stroke, or, alternatively, with horizontal top and bottom strokes connected by a single vertical stroke. In the examples of FIGS. 1 and 2, the "I" is written as a single vertical stroke.

The first letters of each of the words in fields 104–106 respectively are illustrated in detail in FIG. 2. Referring to FIG. 2, an enlarged view of handwritten strokes 201 and 202 that together represent the letter "T" is illustrated. The beginning point of top stroke 201, that is, the point where the stylus first makes contact with the display, is at point 206. The end point of stroke 201, that is, the point where the stylus is lifted from the display, is at point 207. The beginning point of bottom stroke 202 is at point 208. The end point of stroke 202 is at point 209. Note that the beginning point of bottom stroke 202 lies on stroke 201.

Still referring to FIG. 2, the letter "J" is shown formed by top stroke 203 and bottom stroke 204. The beginning of top stroke 203 is at location 211. The end point of top stroke 203 of the "J" is at location 212. The beginning of bottom stroke 204 is at point 213 (which also lies on stroke 203). The end point of bottom stroke 204 is at point 214.

The letter "I" is formed by a single stroke 205 with a beginning point at location 215. The end point of stroke 205 is at location 216.

The intended target fields for the names "Tom", "Jones", and "International" are fields 104–106 respectively. The application of the prior art scheme that defines the target field as the first point of contact of the stylus results in incorrect targeting assignments for each name. Referring to the letter "T", the first point of pen contact with the display, namely point 206, does not lie in any field at all. Therefore, using the prior art scheme describing a target field cannot be properly determined, resulting in an error. Similarly, the first point of contact of the top stroke 203 of the letter "J", namely point 211, does not fall within the boundaries of any field. Therefore, no target field is defined by this prior art scheme, also resulting in error.

Referring to the stroke 205 that defines the letter "I" of the name "International", the first point of contact of the stylus is at point 215, located within the boundaries of field 105. Thus, the prior art scheme defines the target object as field 105. However, the intended target field is field 106. Thus, there is a targeting error.

Another prior art targeting scheme defines the target object as the first object touched by a pen stroke of the writer, regardless of where the first point of contact of the stylus may occur. That is, after the pen touches the display and the writer begins to make a stroke, the very first object or field touched by the stroke is considered to be the target. The operation of this scheme is also illustrated by referring to the characters of FIG. 2.

Referring to the "T" of the name "Tom", the first point of contact of the stylus on the display is at point 206. The first field contacted by the stroke 201 is field 104. Therefore, the second prior art scheme makes the correct targeting decision for this character, namely field 104. However, the second prior art scheme renders incorrect decisions for the other characters of FIG. 2.

Referring to the letter "J" of the name "Jones", the first point of contact of stroke 203 is at point 211, outside the boundaries of any field. The first field contacted by stroke 203 is field 104. Therefore, the second prior are scheme incorrectly identifies the target field as field 104, instead of field 105. This is an incorrect decision.

Referring to the letter "I" of the name "International", the first point of contact of stroke 205 is at point 215, within the boundaries of field 105. Therefore, using the prior art targeting scheme, the target field is incorrectly identified as field 105, when the intended target field is field 106.

Thus, it is a disadvantage of prior art targeting schemes that they do not make accurate targeting decisions when data is entered outside the boundaries of the intended target field.

There are a number of patents that are directed to or relate to computer systems that operate on handwritten data.

Fox, U.S. Pat. No. 4,727,588, provides a system to create and edit handwritten images of documents on an all points addressable digitalizing tablet. The device of Fox stores pen stroke coordinates in order to form word extremities. By comparing a current pen stroke with the preceding pen stroke and the associated word extremity, a new word can be detected. Since each word has an extremity associated with it, the system is able to format a handwritten document. In Fox, a word extremity consists of a rectangular area and a zone of proximity extending from each side of the rectangle. Each new pen stroke is compared with the current zone of proximity of the current word. If any part of the current pen stroke falls within the zone, it is part of the current word. If the current stroke is outside the zone of proximity, the beginning of a new word is detected. Thus, Fox employs a rectangle to help indicate the beginning of a new word. Fox does not teach a rectangle/area overlap technique to provide targeting Ward, U.S. Pat. No. 4,562,304, is directed to emulating keyboard input using a hand-print terminal that includes a digitizing tablet. In Ward, characters are written with a pen in boxes of a grid paper that is disposed upon the digitizing tablet. The characters are converted to ASCII and stored in a line buffer memory at their respective column positions. The contents of the line buffer is serially output to the computer just as a keyboard supplies serial data to a computer. The system of Ward allows only one row of data to be "worked on" at a time. Therefore, the beginning of a new row is determined by comparing the current character row position on the grid with that of the previous character. If the row values differ, the line buffer memory is cleared and a new row can be entered and edited. Ward teaches writing characters within a specified box to allow for character recognition. As such, Ward does not teach a targeting scheme for characters written in adjacent boxes or written only partially in one box.

Tsugei, U.S. Pat. No. 4,656,317, is directed to an apparatus for providing handwritten data to computer memory by categories. The invention uses a format paper with predefined "write areas" disposed upon a digitalizing tablet wherein each "write area" is a category of information to be processed. After information is written within the "write areas" with a pen, it is stored in RAM by category. The invention of Tsugei uses a computer program to recognize when information has been written within a specified area on a digitizing tablet. Tsugei does not disclose a targeting technique in the case where information is written outside the designated areas.

A system that allows for pen input for different application programs such as a word processor or database is described in Sklarew, U.S. Pat. No. 4,972,496. The input pen is used to designate a location to enter data. An input box or line appears on the screen and the pen is used to input text. The invention of Sklarew provides a "learning" feature in which handwritten characters are matched to a database to determine the characters. A character not found in the database is appended. Thus, the invention is adaptable to all handwriting styles. Sklarew provides for handwritten data input within a rectangular input box and does not utilize a targeting scheme.

The invention in Hardin, U.S. Pat. No. 4,817,034, is directed to a system for replicating handwritten signatures. A pen is used to input a signature that is stored in computer memory for future use. The signature data can be provided to a plotter to replicate the handwritten signature. To enter a signature, an input rectangle and signature line is provided by software. Hardin utilizes a rectangular input area for pen input. The system of Hardin does not disclose a method for targeting a signature that exceeds an input area bounds.

A device for editing text is disclosed in van Raamsdonk, U.S. Pat. No. 4,475,239. As the user enters text via a keyboard, a printing head prints the characters on a record carrier which is disposed upon a digitalizing panel. As the characters are entered, they are also stored in computer memory. After a page is stored in memory and printed, a pen is used to assist in editing. For example, the user places alignment marks on the record carrier to allow the system to align the printed text with the corresponding text in memory. Next, using the pen, the user marks the location on the record carrier to perform an operation, such as insert text. After the location is marked, the keyboard is used to enter new characters. The keyed-in characters are inserted into the computer's memory and do not appear on the record carrier. Van Raamsdonk teaches the use of alignment marks to define an edit area. However, van Raamsdonk does not disclose a targeting scheme for marks written outside the edit area.

Sato, U.S. Pat. No. 4,947,156, discloses a handwritten character input device that includes a means to correct deviations on a display due to variations in angles of the input pen. The invention accounts for and corrects LCD dots that are inadvertently lit because of the angle that the input pen makes with the display screen. Sato relates generally to the field of pen based computer systems and does not disclose a targeting scheme.

The following is a patent teaching a scheme that uses a rectangle overlap scheme in a conventional keyboard based computer system.

Ikegami, U.S. Pat. No. 4,677,585 teaches a system in which information having a predetermined format is stored as a card image within a data processing system. The user defines a card by providing coordinates to indicate the size of fields and the desired location on the card. In the case of character data, the fields may be more than one row, thus forming a rectangle. The invention disclosed in Ikegami allows the user to define rectangular areas in which to input character data. The user also defines the location on a card that the rectangular input area will occupy on the display screen. The invention allows for more than one character field may be placed on a card. Therefore, the system utilizes a rectangle overlap technique to determine whether any adjacent character fields intersect. However, the scheme of Ikegami is carried out before any character data entry is performed. That is, the rectangle areas are defined prior to any data input.

SUMMARY OF THE INVENTION

The present invention provides an improved method for targeting and splitting in a computer system. A block of data (such as a character or word) is identified by analyzing strokes of writing to determine if a current stroke is to be associated with the strokes of an existing block of data or with a new block of data. Displacement in the X direction and Y direction between a prior stroke and a current stroke is generated and analyzed to determine if a new block of data has been created. After a block of data has been identified, a targeting operation for that block is performed. The bounds of the smallest rectangle that contains all of the strokes in the block is determined. The area overlap between the bounded rectangle and every object or field touched by the rectangle is calculated. If a preselected threshold percentage of the bounded rectangle overlaps a single field or object, that field or object is identified as the target. If no one field or object is overlapped by at least the preselected percentage area of the bounded rectangle, bounding rectangles are defined for each character or stroke in the block of data. The amount of overlap of the bounded characters is determined, and the field having the greatest area of overlap is identified as the target field.

In an alternate embodiment, a bounded rectangle is generated for the data block and the center of the rectangle is determined. The object overlapped by the center of the writing rectangle is identified as the target object.

DETAILED DESCRIPTION OF THE INVENTION

A targeting system for use in a computer system is described. In the following description, numerous specific details, such as processor type, processor speed, operating system type, etc. are set forth in detail to provide a more thorough description of the present invention. It will be apparent, however, to one skilled in the art, that the present invention may be practiced without these specific details. In other instances, well known features have not been described in detail so as not to unnecessarily obscure the present invention.

The invention provides a splitting and targeting system for use in handwriting entry computer systems. The targeting decision of the present invention is not made until a block of data has been entered. This is in contrast to the prior art, in which targeting decisions are made at the initial stages of the entry of the data to be targeted. The present invention uses a boundary analysis scheme to determine the intended target field of the data.

The preferred embodiment of the invention is incorporated in computer software for use, for example, with the PenPoint™ operating system for pen-based computers, such as those manufactured by GO™ Corporation of Foster City, Calif. However, the invention can be used with a wide variety of other operating systems and other computers and computer systems.

Figure 1:
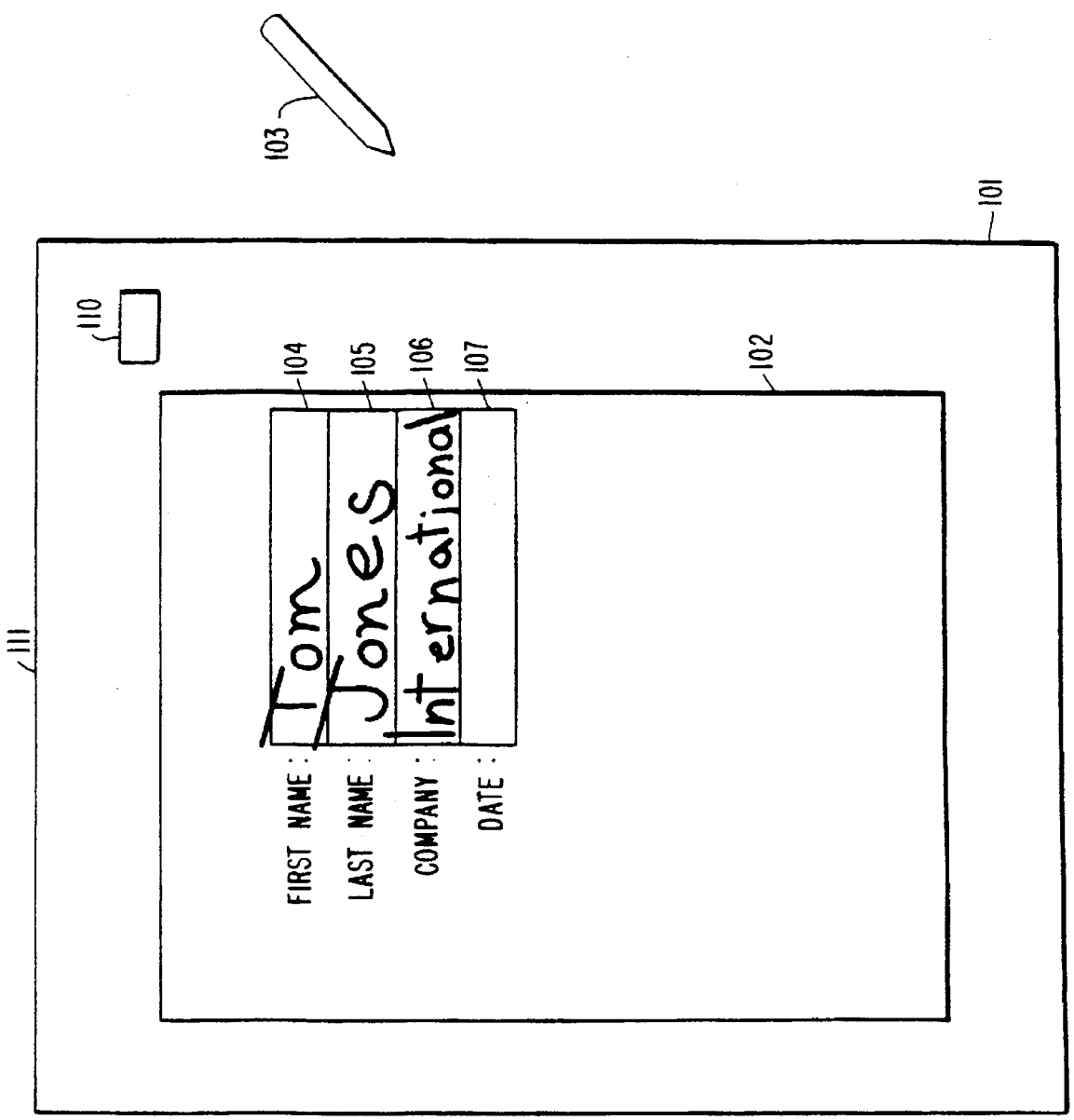
FIG. 1 is a diagram of an entry form on the display of a computer system.
Figure 2:
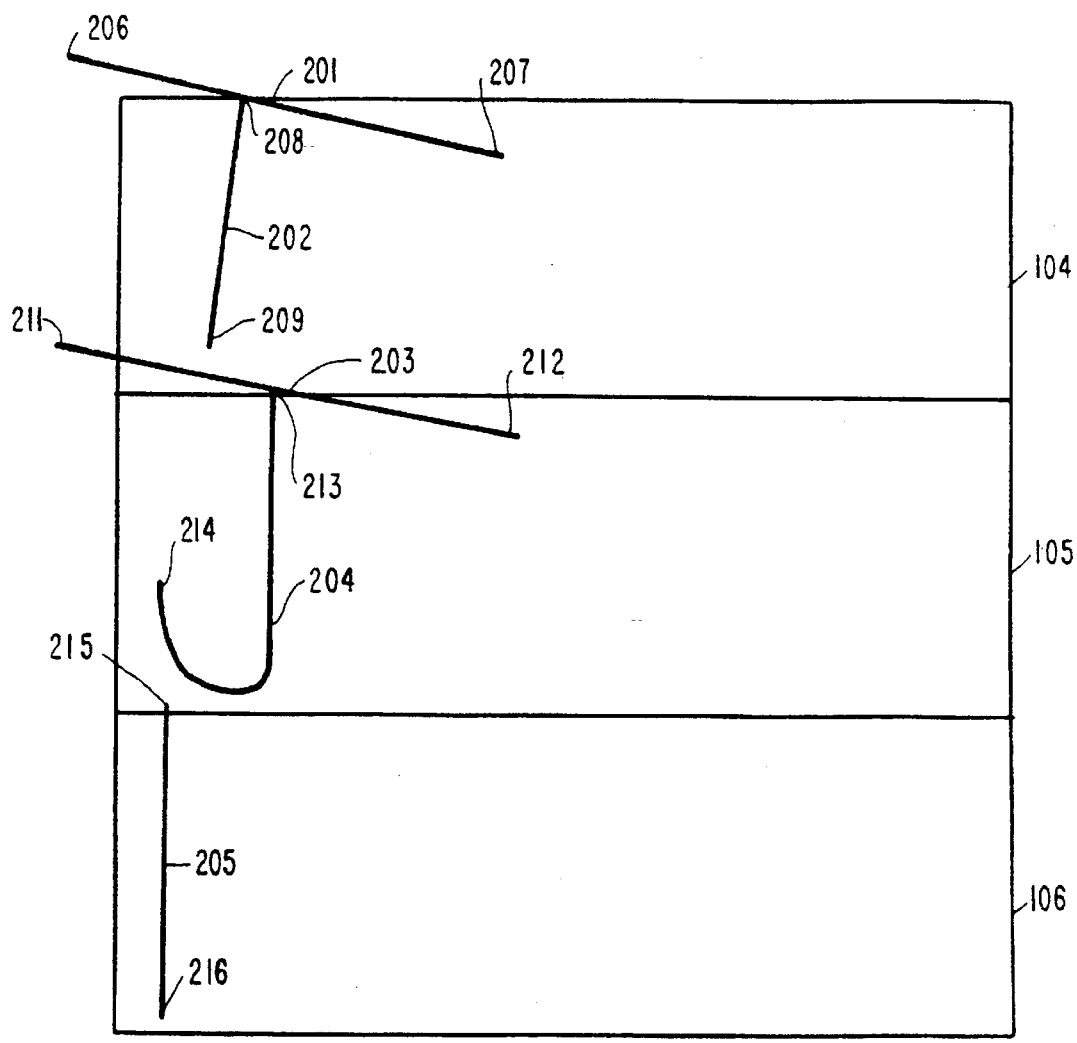
FIG. 2 is an enlarged view of fields 104, 105, and 106 of FIG. 1.

FIG. 1 shows an example of a handwriting entry computer of a type that may be used with the present invention. It consists of a pen sensitive display 102 disposed in a housing 101. The front of the housing features an on/off button 110. Input/output ports for a disk drive, communications, and a printer, a power supply socket, and a contrast control (not visible) are located along the top 111 of housing 101.

The pen-sensitive display senses the position of a special stylus 103 when the tip of the stylus is near to, or contacts the display.

Internally, the computer of FIG. 1 uses at least an Intel 80286 microprocessor chip running at 16 Mhz or more. Preferably, at least four megabytes of random access memory (RAM) is included.

The items on the display are accessed with hand held stylus 103. The stylus may be used to write characters, "gestures", words or illustrations on the display. Except for certain standard "gestures", the way that such handwritten input is handled generally depends on the specific software application being used.

"Gestures" are simple types of pen movements that invoke certain specified commands. The present invention utilizes approximately a dozen standard "gestures" that form part of its user interface. Examples of these "gestures" are left and right brackets ("[" and "]"), often used for selecting words or a section of text, an up-caret ("^"), for accessing an editing pad that can be used for data entry, single strokes or "flicks" right, left, up or down, which are used for scrolling, and "taps" or "presses" which are used to invoke commands.

The operating system of the preferred embodiment of the present invention also provides data to an application about any writing that is done on the display with the stylus. The operating system records events such as "pen down", "pen up", pen position, and pen movement, and makes the record of such events available to applications running on the computer system.

The present invention implements a targeting scheme that makes targeting decisions based on the entire block of data that is intended to be entered in a target field or object. Using the present invention a block of data is identified and the boundaries of the smallest rectangle that contains the data is determined. If more than a preselected percentage of the area of the rectangle defined by the boundaries of the data is within the boundaries of a particular field, that field is defined to be the target field. If that threshold condition is not met, a boundary is defined for each stroke in the block of data. The areas of the rectangles defined by the boundaries of each stroke are then examined. The total overlap between each field and all stroke boundary boxes is calculated. The target that has the greatest total stroke overlap area is selected.

The present invention is described in connection with the entry of handwritten data consisting of one or more pen strokes. This is by way of example only, as any type of data may be used in connection with this invention.

Using this invention, a splitting decision to identify a block of data is made as strokes are entered. A targeting decision is made only after the entry of a block of data has been completed. Blocks of data may consist of strokes, words, numerals, symbols, gestures, or combinations thereof. Blocks of data are identified by detecting and analyzing the displacement in the X and Y directions of an XY coordinate system between a current stroke and a previous stroke. The completion of entry of a block of data is identified when entry of a new block of data begins. The entry of a new block of data begins when a current stroke is displaced from a previous stroke by a certain amount. When these conditions are satisfied, the current stroke is said to be "split" from the previous stroke.

Splitting in the X direction

In the following descriptions of splitting in the X direction and the Y direction, examples are provided of displacements used in the preferred embodiment of the invention. These are given by way of example only. Other displacement may be used without departing from the spirit and scope of the present invention.

Figure 4:
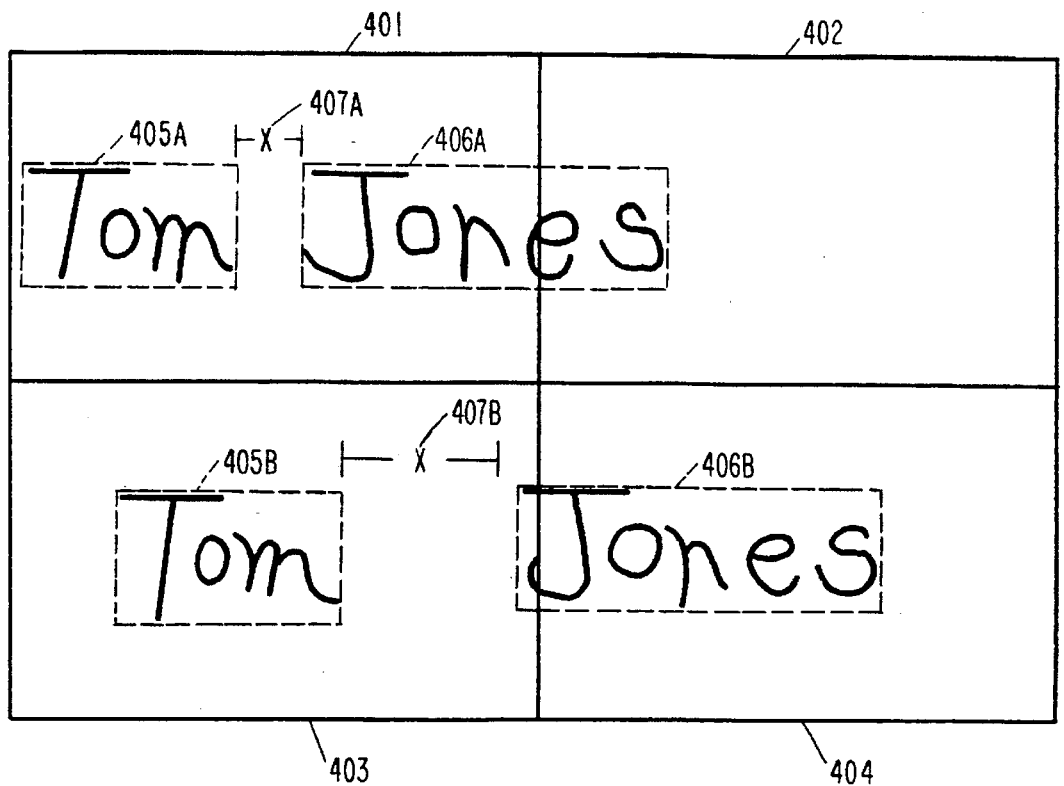
FIG. 4 is a diagram illustrating X displacement in the present invention.

The operation of the present invention in making decisions concerning splitting in the X direction is illustrated in FIG. 4. Referring to FIG. 4, an enlarged view of four fields 401–404, arranged in a two-by-two array, is shown. The present invention identifies a stroke as being separate from prior strokes if the new stroke is displaced in the X direction by a predetermined distance. In the preferred embodiment, this distance is greater than 0.5 inches.

Referring to FIG. 4, the words "Tom" 405A and "Jones" 406A have been written in fields 401 and 402. Word 405A is written entirely in field 401, while word 406A begins in field 401 and extends into field 402.

An algorithm (described in detail below) is performed comparing the location of each stroke with the previous stroke to determine if the current stroke is to be grouped with prior strokes or to be treated as a separate stroke or group of strokes. When this comparison is done for each of the strokes that make up the letters "T," "o" and "m" in the word "Tom," the X displacement is less than 0.50 inches in each case so those letters are grouped as a single block of data 405A. However, the X displacement 407A between the "m" in Tom and the first stroke, (the "hook"), of the letter "J" in Jones is greater than 0.50 inches. Therefore, that stroke, (and consequently the letter "J"), is a candidate for a "split" from the "m" at the end of the word "Tom". However, it is not actually split from the prior block of strokes because the first stroke (the hook of the J), is not less than 49% in target field 401. The remaining strokes of the letters that make up the word Jones are all within the appropriate X distance, and so are not candidates for splitting.

Figure 5:
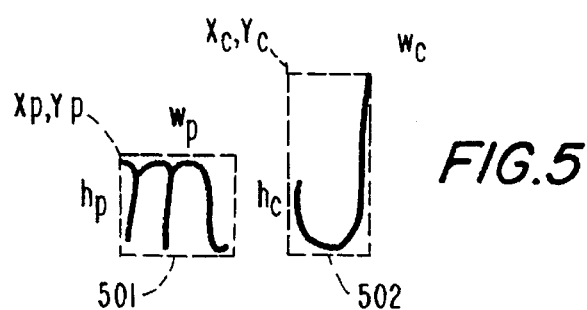
FIG. 5 is a diagram illustrating the bounding of individual characters in the present invention.

The X displacement calculation is performed by accessing certain information that is provided about each stroke of data entered into the computer of the present invention. When a stroke is entered in a computer, the "bounds" of the stroke are determined. For example, the bounds of the letter m are shown as dashed rectangle 501 in FIG. 5. The bounds are defined by the points of intersections of horizontal lines drawn at the uppermost and lowermost points of the stroke, as well as vertical lines drawn at the leftmost and right-most points of the stroke. Thus, the bounds or rectangles include each point of this stroke under consideration. The bounds are defined by an origin point $X_P$, a width $w_P$ representing the X displacement from the origin $X_P$ and a height $h_P$ representing the vertical displacement from the origin $X_P$. In the present invention, the "$_P$" indicates that the information is for the previous stroke that has been entered. Similarly, the current stroke (for example, the hook of the letter "J") of FIG. 5, is defined by a rectangular bounds 502. The current stroke has an origin $X_C$ (where the "$_C$" indicates the current stroke), a width $w_C$ and a height $h_C$. The X displacement is determined by the following equation:

$$ABS((X_P+w_P)-X_C)>0.50 \text{ inches} \qquad \text{[Equation 1]}$$

Figure 6:
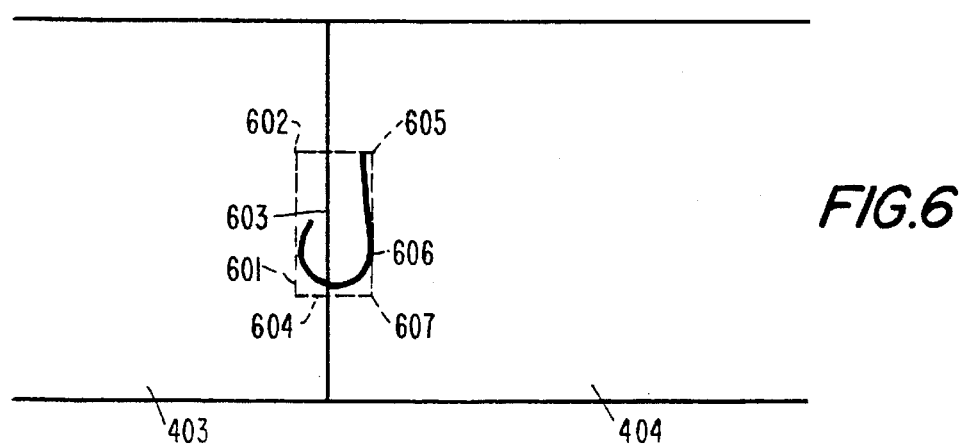
FIG. 6 is an expanded view of the boundary of fields 403 and 404 of FIG. 4.

To determine if a subsequent stroke or block is to be targeted to a different field, the present invention reviews every stroke as it is generated to determine if it begins a new block of data. Refer now to the data in fields 403 and 404. Again, the word Tom 405B is written entirely within field 403. The X displacement 407B between the "m" of Tom and the hook of the letter "J" of Jones is greater than 0.50 inches. Therefore, the first stroke of the letter "J" of the word Jones is a candidate for splitting from the block of data that ends with the stroke "m". An analysis of the first stroke of the block Jones 406B is undertaken to determine if a split does occur. Referring now to FIG. 6, an enlarged view of the first stroke of the letter "J" is illustrated. In the present invention, if the first stroke of a new word is more than 50 percent in a different field than the preceding stroke, a split occurs.

In the example of FIG. 6, the bounds of the stroke are drawn, and the ratio of the areas overlying fields 403 and 404 is determined. A rectangle formed by the line 601, 602, 603 (the boundary between fields 403 and 404 between lines 602 and 604) and line 604 defines the area of the bounds of the stroke that lies within the boundaries of field 403. Similarly, a rectangle 603, 605, 606, 607 define the area of the boundaries of the stroke that lies within the boundaries of field 404. In the example shown, the area of the rectangle 603, 605, 606, 607 is greater than the area of the rectangle 601, 602, 603, 604. Therefore, the stroke, and by extension, all strokes following it, are split from the block "Tom".

Figure 7:
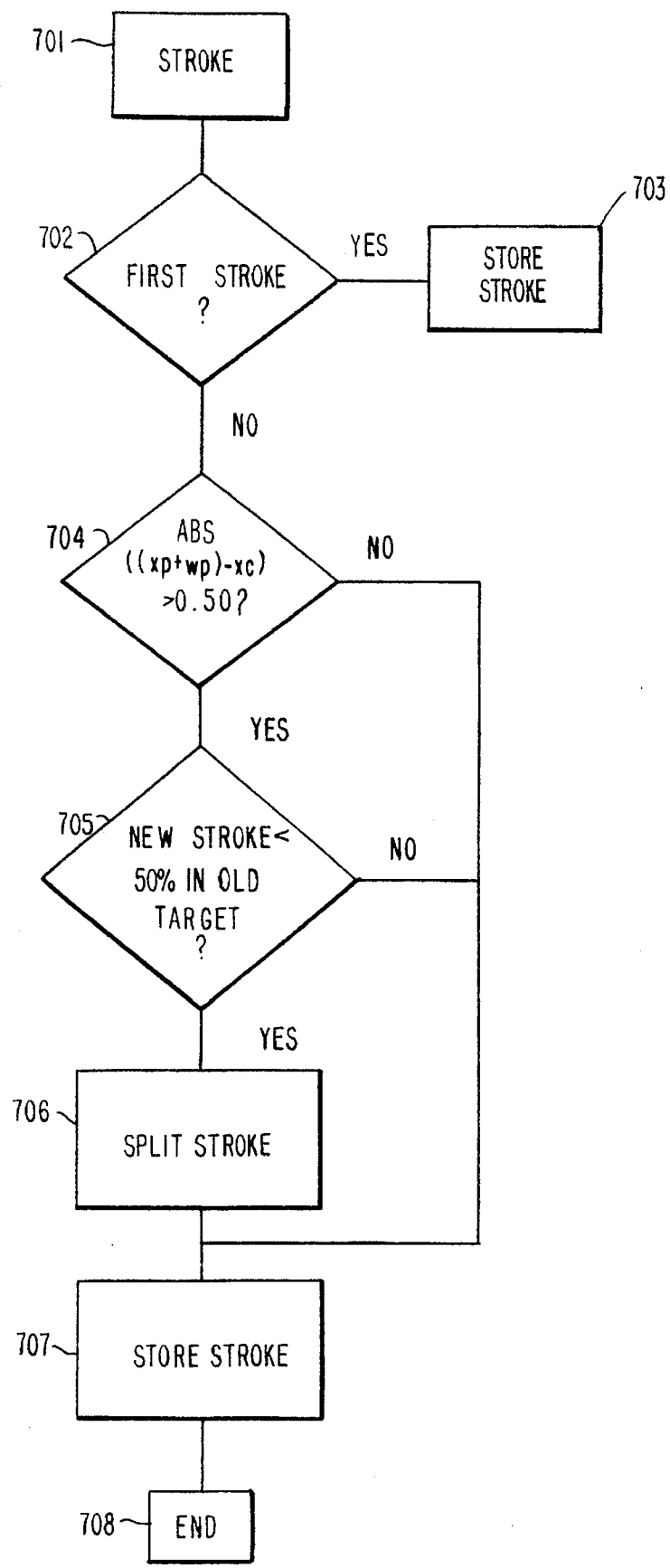
FIG. 7 is a flow diagram illustrating the X displacement algorithm of the present invention.

A flow diagram of the operation of the X displacement algorithm of the present invention is illustrated in FIG. 7. At step 701, a stroke is written by the user. At decision block 702, the argument "first stroke?" is made. If the argument is true, there is no prior stroke to compare the stroke with so the stroke is stored at step 703 and the system returns to decision block 702. If the argument is false, the system proceeds to step 704 and the $X_C$, $Y_C$, $h_C$ and $w_C$ values for the stroke bounds are generated.

After these values are generated, the system determines whether "$ABS((X_P+w_P)-Xc)>0.50$ inches?", is made. If the argument is false, the system proceeds to step 707. If the argument is true, the system proceeds to decision block 705 and the argument "New stroke <50% in old target?" is made. If the argument at decision block 705 is false, the system proceeds to step 707. If the argument at decision block 705 is true, the system proceeds to step 706 and the conditions for splitting a stroke are met. At step 706, the stroke is split from the prior stroke. At step 707, the stroke is stored as the previous stroke and the process ends at step 708.

Splitting in the Y Direction

The present invention identifies a block of data as a candidate for splitting if the block satisfies a three-part test for displacement in the Y direction. The first test looks for the Y displacement between the end of a previous stroke and the beginning of a stroke. If the Y displacement is greater than 0.15 inches, the first part of the test is satisfied and the current stroke is a candidate to be split from the prior stroke.

The second test determines if the current stroke is located between the upper and lower bounds of the prior stroke. If the current stroke is not within the upper and lower bounds of the prior stroke, the second part of the test is satisfied. This test is to identify small strokes that may be written after large strokes that make up capital letters and are entirely within the upper and lower bounds of the prior large stroke. Although the distance between the vertical distance of the large stroke and the small stroke may be greater than 0.15 inches, because the small stroke is with the bounds of the large stroke, no splitting will occur.

The third part of the test compares the centers of the bounded areas of a prior stroke and a current stroke. If the centers are at least 0.25 inches apart in the Y direction, then the third part of the test is satisfied and the current stroke is a candidate to be split from the prior stroke. If a stroke that is a candidate for splitting also has more than 50% of its bounded area in a different target than the previous stroke, it is split from the previous stroke.

Figure 8A:
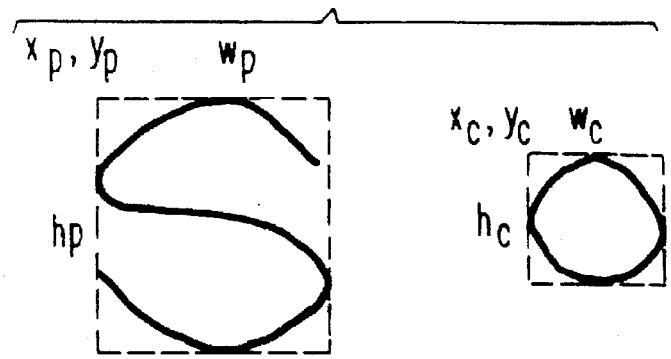
FIGS. 8A–8C are examples illustrating Y displacement in the present invention.
Figure 8B:
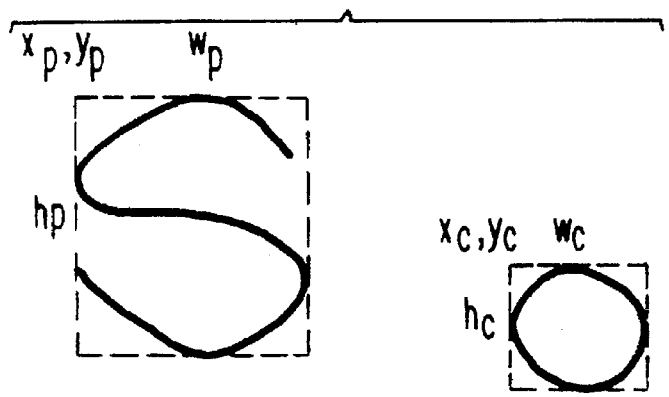
Figure 8C:
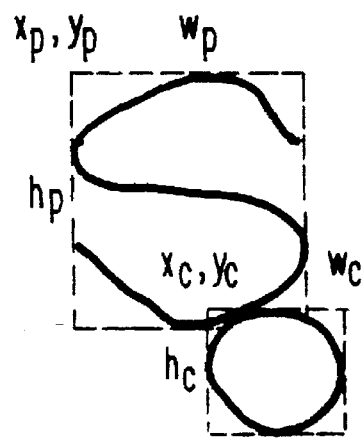

A number of examples of the application of the Y displacement tests are illustrated in FIGS. 8A–8C. Referring first to FIG. 8A, two strokes "S" and "o" are shown. The stroke S is bounded and has an origin at a point $X_P$, $Y_P$ with the width $w_P$ and a height $h_P$. The stroke "o" is a small o and has an origin at point $X_C$, $Y_C$ with a width $w_C$ and a height $h_C$. In the first test, it is determined if the Y displacement between the previous stroke "S" and the current stroke "o" is greater than 0.15 inches. This is accomplished by the equation:

$$ABS(Y_P-Y_C)>0.15 \text{ inches} \qquad \text{[Equation 2]}$$

In the example shown, this distance is greater than 0.15 inches. In the preferred embodiment of the present invention, the Y displacement between the lower bounds is also compared to determine if the stroke is a candidate for splitting based on Y displacement. This is accomplished by the equation:

$$ABS((Y_P+h_P)-(Y_C+h_C))>0.15 \text{ inches} \qquad \text{[Equation 3]}$$

In the example of FIG. 8A, this distance is also >0.15 inches so the stroke o is still a candidate for splitting.

Applying the second tests to the example of FIG. 8A, it is determined if the current stroke is completely contained within the upper and lower bounds of the first stroke. This is accomplished by the following equation:

$(Y_C > Y_P)$ and $((Y_C + h_C) < (Y_P + h_P))$  [Equation 4]

Implementing this equation, it is seen that the current stroke "o" is completely contained within the upper and lower boundaries of the prior stroke "S". Therefore, these strokes should not be split based on Y displacement.

Referring now to FIG. 8B, the same two strokes "S" and "o" are illustrated, but in a different orientation than in FIG. 8A. Applying the first test, and applying equation 2 it is determined that there is at least 0.15 inches between $Y_P$ and $Y_C$. Similarly, applying Equation 3 yields a displacement greater than 0.15 inches, as well. Therefore, the first part of the test is met. Applying the second test, it is shown that the stroke o is not contained within the upper and lower boundaries of the previous stroke. Therefore, the second test is met and the stroke remains a candidate for splitting based on Y displacement. Next, the third test is applied and the centers of the bounds of the current and previous character strokes are examined. This is accomplished by the equation:

$ABS((Y_P + (h_P/2)) - (Y_C + (h_C/2))) > 0.25$ inches  [Equation 5]

The third test fails in the example of FIG. 8B because the centers of the current stroke "o" and the previous stroke "S" are less than 0.25 inches apart.

FIG. 8C illustrates an example where all three tests are met and a splitting of strokes based on Y displacement is proper, if the current stroke is also greater than 50% in a different target than the previous stroke. The first test is met because the difference based on Equation 2 is >0.15 inches. Similarly, Equation 3 is satisfied because it also results in a distance of >0.15 inches.

The second test is met because the current stroke is not contained entirely within the upper and lower bounds of the prior character. Finally, the third test is met because the centers of the bounds of the current and prior strokes are more than 0.25 inches apart.

The present invention also handles special cases, such as the top stroke of an "F", "J", "T" as well as the dot on a small "i". For letters having a top, horizontal stroke, often a user does not actually touch the top stroke to the remainder of the strokes of the character. In these circumstances, the top stroke may be incorrectly identified as a stroke that is to be split based on Y displacement. The present invention applies the test that if a stroke has a slope of less than one-third, it is assumed to be the top of a capital letter and the Y displacement test is not executed. For the dot of an "i", (which may often satisfy the conditions for splitting based on Y displacement), if the height plus the width of the stroke (the dot of an i) is less than 8 points, the stroke is identified as the dot of an i and no Y displacement test is implemented.

The dot on an i may also create problems because one thing that should be permitted is for a user to tap on two different fields and have the taps split appropriately. The present invention also implements the convention that if the last stroke was also a tap (a potential dot of an i) then the "dot of the i test" is not applied to the current stroke and splitting is allowed on the second tap.

As with the splitting decision in the X direction, if a new stroke satisfies the splitting decision based on the Y displacement tests, a decision is then made as to the targeting of the new stroke. If the new stroke falls more than 50 percent inside a separate target field than the previous stroke, then the new stroke is split from the old stroke. If the new stroke is more than 50 percent in the original target field, then that stroke and strokes associated with that stroke are not split from the prior stroke.

Figure 9:
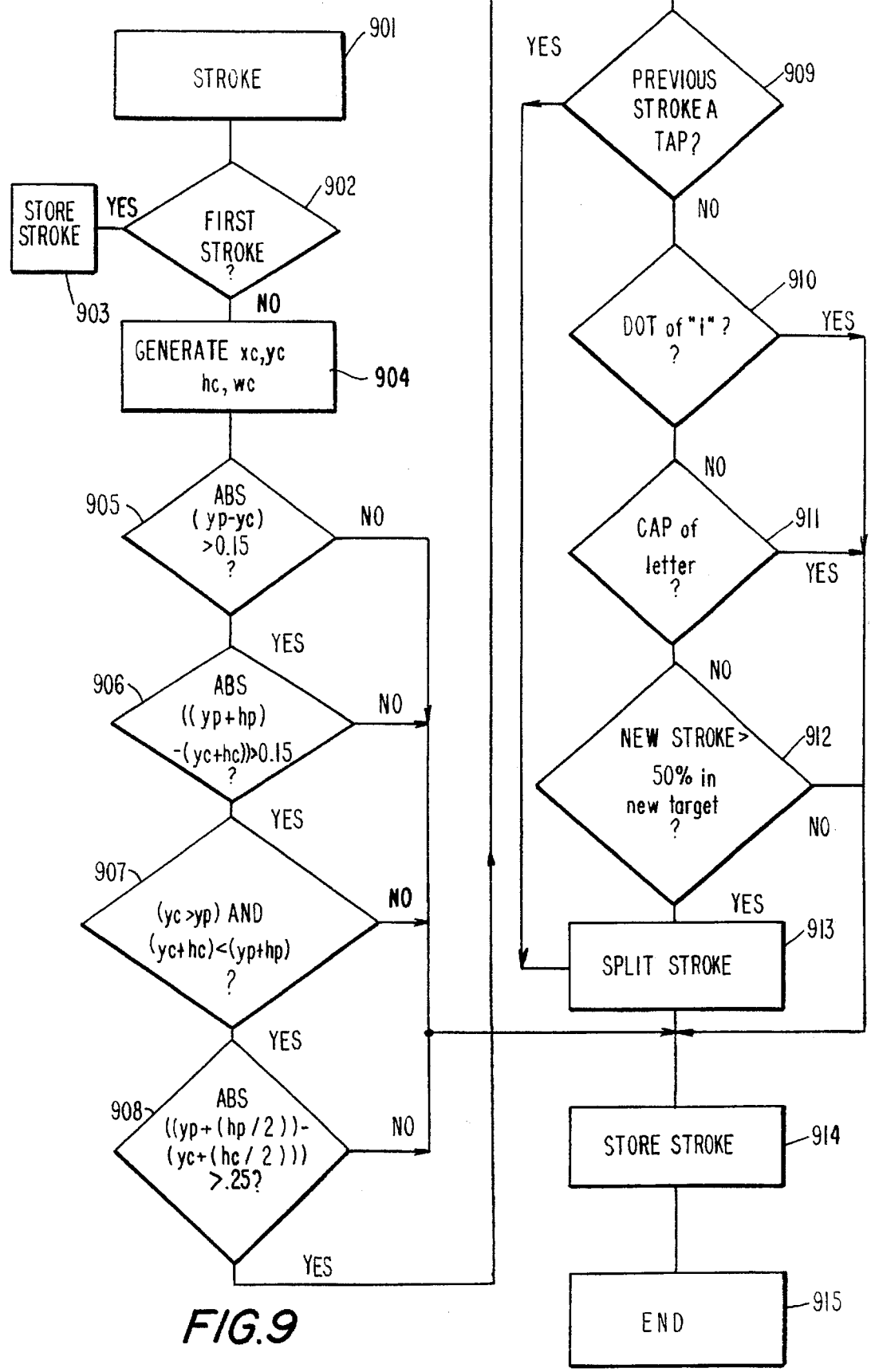
FIG. 9 is a flow diagram illustrating the operation of the Y displacement algorithm of the present invention.

A flow diagram illustrating the operation of the present invention in determining splitting the Y direction is illustrated in FIG. 9. The system begins at step 901 where a stroke is written by a user. At decision block 902, the argument "first stroke?" is made. If the argument is true, meaning there have been no prior strokes, the system proceeds to step 903 where the stroke is stored. After step 903, the system returns to decision block 902.

If the argument at decision block 902 is false, the system proceeds to step 904 and the values $X_C$, $Y_C$, $h_C$ and $w_C$ are generated for the current stroke.

At decision block 905, the argument "ABS($Y_P - Y_C$) >0.15?" is made. If the argument is false, no splitting occurs and the system proceeds to step 914. If the argument is true, the system proceeds to decision block 906. At decision block 906, the argument "ABS($(Y_P + h_P) - (Y_C + h_C)$)>0.15?" is made. If this argument is false, the system moves to step 914. If the argument is true, the first part of the Y displacement test is met and the system proceeds to decision block 907.

At decision block 907, the argument "$(Y_C > Y_P)$ AND $(Y_C + h_C) < (Y_P + h_P))$?" is made. If the argument is false, the system proceeds to step 914. If the argument is true, the second part of the Y displacement test is met and the system proceeds to decision block 908.

At decision block 908, the argument "ABS($Y_P + (h_P/2)$) - $(Y_C + (h_C/2))$>0.25 inches" is made. If the argument is false, the system moves to step 914. If the argument is true, the third part of the Y displacement test is met and the system proceeds to decision blocks 909–911. These decision blocks are used to determine if any of the exceptions (double tap, dot of an i, top of a capital letter) are met. At decision block 909 the argument "previous stroke a tap?" is made. That is, was the prior stroke a tap itself. If the argument is true, the system proceeds to step 913. If the argument is false, the system proceeds to decision block 910. At decision block 910, the argument "dot of i?" is made. If the argument is true, that is, the mark is the dot of an i, the system proceeds to step 914 and no splitting of the strokes is performed. If the argument is false, the system proceeds to decision block 911. At decision block 911, the argument "cap of letter?" is made. If the argument is true, no splitting is performed and the system proceeds to step 914. If the argument is false, none of the exceptions have been met and the system proceeds to step 912. At decision block 912, the argument "New stroke greater than 50% in new target?" is made. If the argument at decision block 912 is false, the system proceeds to step 914. If the argument at decision block 912 is true, the system proceeds to step 913. At step 913, the current stroke is split from the prior stroke. At step 914, the current stroke is then stored as the previous stroke and the process ends at step 915.

Targeting

After identifying a block of data by using the splitting algorithms described above, the present invention employs a targeting algorithm to determine the intended target field of the block of data. The present invention uses a two-part test for the targeting algorithm. In the first part of the test, the bounds of the data block are determined and the percentages of the bounded area that lie over possible target fields is determined. If a preselected percentage of the bounded area of the block of data falls within the boundaries of a single field, that field is identified as the target field. In the preferred embodiment of this invention, the preselected percentage is 70%. However, other preselected percentages can be utilized as a threshold without departing from the scope of the invention.

Figure 10:
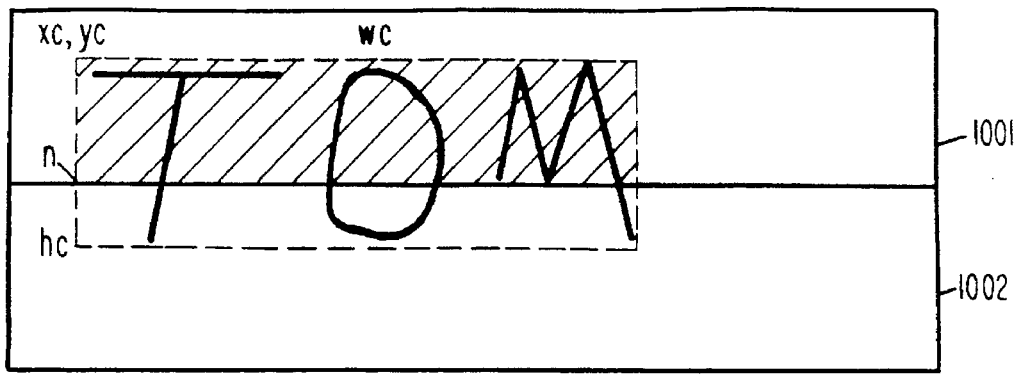
FIG. 10 is a diagram illustrating targeting in the present invention.

An example of an application of the threshold test is illustrated in FIG. 10. In FIG. 10, there are two adjacent fields, 1001 and 1002. The word "Tom" is written with the intended target field being field 1001. After the word Tom is written and identified as a block of data, the bounds of the block of data are determined and the values $X_C$, $Y_C$, $h_C$ and $w_C$ are generated. Next, comparison of the areas of the bounded block of data that overlap fields 1001 and 1002 are compared. The boundary between fields 1001 and 1002 intersects the bounds of the word Tom at point n, intersecting the vertical bounds of the word Tom between the origin $Y_C$ and the bottom edge at $Y_C+h_C$. The area of the portion overlaying field 1001 is generated by multiplying the length of the line segment between points $Y_C$ and n by the width $w_C$. This area is Area$_{1001}$ and is shaded in FIG. 10. This area is compared to the overall area of the bounds of the block of data, namely $h_C \times w_C$ to come up with Area$_{Total}$. If Area$_{1001}$/Area$_{Total}$ is greater than 0.7, the target field is field 1001.

Figure 11A:
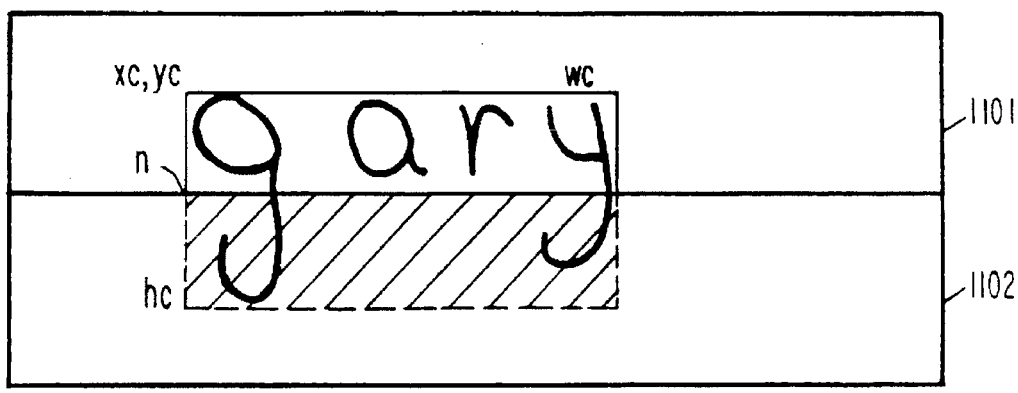
FIGS. 11A and 11B are diagrams illustrating the second step of the targeting process of the present invention.
Figure 11B:
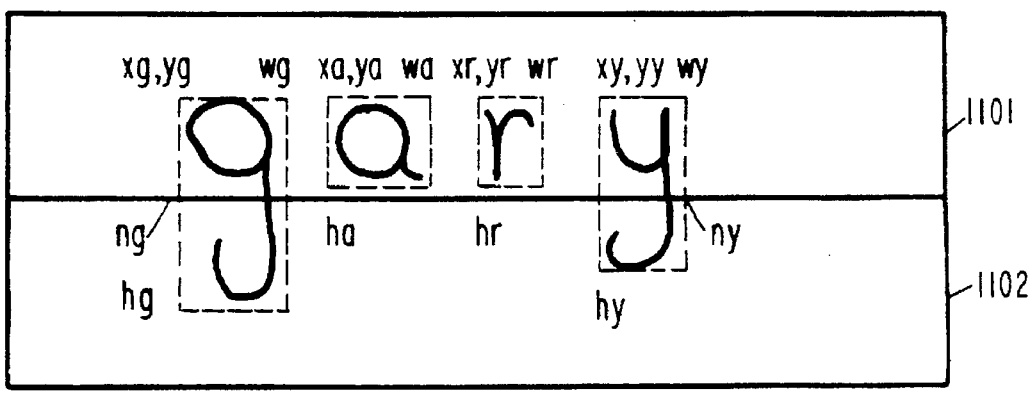

There are some circumstances where the first test is not met because less than 70 percent of the bounded area of the block of data overlaps the intended target field. This is particularly true if the block of data includes one or more "descenders," that is, letters with "tails" that extend below the line of writing, such as g, y, j, etc. Such an example is illustrated in FIGS. 11A and 11B. In FIG. 11A, the word "gary" is identified as a block of data. The bounds of the word gary are determined and the values $X_C$, $Y_C$, $h_C$ and $w_C$ are determined. The total area of the bounds of the block of data gary, $w_C \times h_C$ are calculated. Then the areas overlapping fields 1101 and 1102, respectively, are calculated and compared to the overall area. The area overlapping field 1101 is determined by multiplying $w_C$ by the length of the line segment between points $Y_C$ and n. This area, Area$_{1101}$ (not shaded) is compared to the total area and is found to be less than 70 percent of the total area. Therefore, the threshold test is not met. Similarly, the shaded area overlying field 1102 is calculated by subtracting the length of the line segment between points $Y_C$ and n from the height $h_C$ and multiplying the result by $w_C$. This area is compared to the total area and is again found to be less than 70 percent, so the threshold test is not met.

At this point, the present invention determines the target field by determining the bounds of the individual strokes of the block of data and adding the areas overlapping one field and comparing that sum to the sum of the areas overlapping any other fields. The field with the largest area overlapped is the target field. This is illustrated in FIG. 11B. The bounds for the individual strokes are calculated and origins, widths and heights are calculated for each stroke. For example, bounds are determined for the letter g, and origin $X_g$, $Y_g$, width $w_g$ and height $h_g$ are determined. By summing the areas overlapping field 1101 and comparing that to the sum of the areas overlapping field 1102, it is clear that the target field is field 1101.

Figure 12:
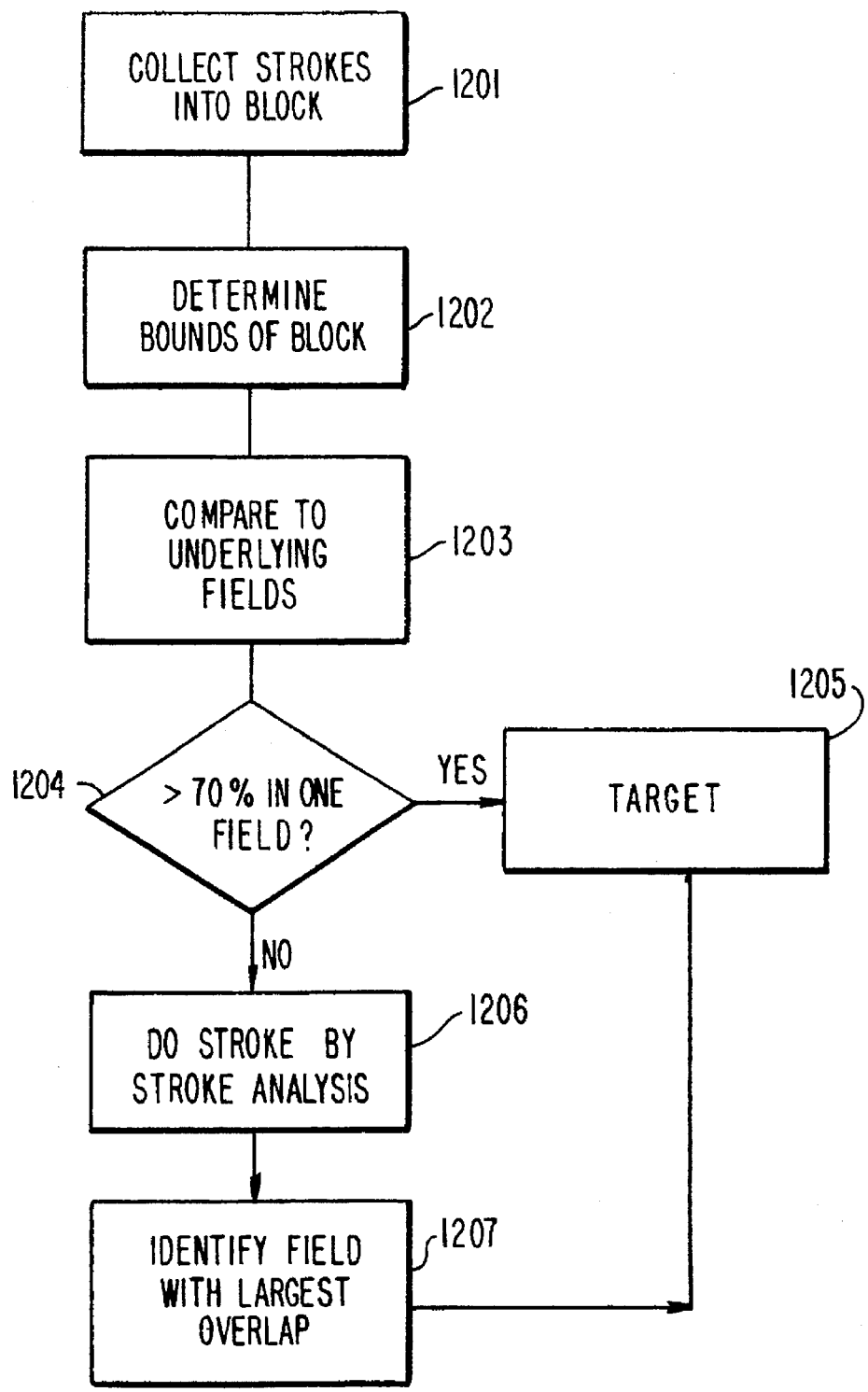
FIG. 12 is a flow diagram illustrating the targeting algorithm of the present invention.

A flow diagram illustrating the operation of the target scheme of the present invention is illustrated in FIG. 12. At step 1201, strokes are collected into a block of data. This is accomplished by executing the Y displacement and X displacement algorithms described previously. At step 1202, the bounds of the block are determined and values $X_C$, $Y_C$, $w_C$ and $h_C$ are calculated.

At step 1203, the percentage of the bounded data block that overlaps any one field is compared to the overall area of the data block. The system then proceeds to decision block 1204. At decision block 1204, the argument "> than 70 percent of area overlapping one field?" is made. If the argument is true, the system proceeds to step 1205 and that field is identified as the target field. If the argument at decision block 1204 is false, the system proceeds to step 1206. At step 1206, a stroke by stroke analysis is performed. The analysis is performed by generating bounds for the individual strokes of the data block and comparing the sum of the areas overlapping one field with the sum of the areas overlapping other fields. At step 1207, the field with the largest overlap is identified. The system then proceeds to step 1205 and that field is identified as the target field.

In an alternate embodiment of the invention, the center of the bounded area of a block of data is determined. The field that is overlapped by the center point is then identified. This field is made the target field. The center point of a bounded area is determined by the following equation:

$$X_{center}=(X_C+(w_C)/2); Y_{center}=(Y_C+(h_C)/2)$$

After the center point $X_{center}$, $Y_{center}$ is determined, its coordinates are compared to the coordinates of fields and objects on the display. If the coordinates found within the boundaries of a field or object match the coordinates of the center point, that field or object is the target.

Targeting Gestures

Figure 13:
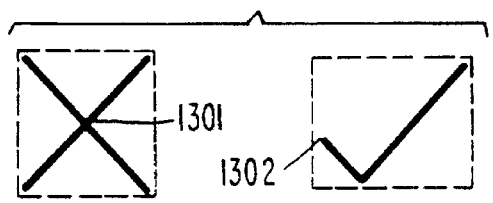
FIG. 13 illustrates diagrams of gestures for use in the present invention.

The present invention also implements a scheme for targeting gestures. As noted above, gestures are command strokes that direct certain operations, such as deleting a stroke or word, selecting text, etc. An example of several gestures is illustrated in FIG. 13. These gestures include an "X" often used for deleting text, and a "✓". In the present invention, gestures may have "hot points". A hot point is an area of action of the gesture. Typically, the hot point of a gesture is positioned over the object or field to be acted upon. For example, the "X" has a hot point 1301 at the intersection of the X. The ✓ has a hot point 1302 at the beginning of the checkpoint.

Figure 14:
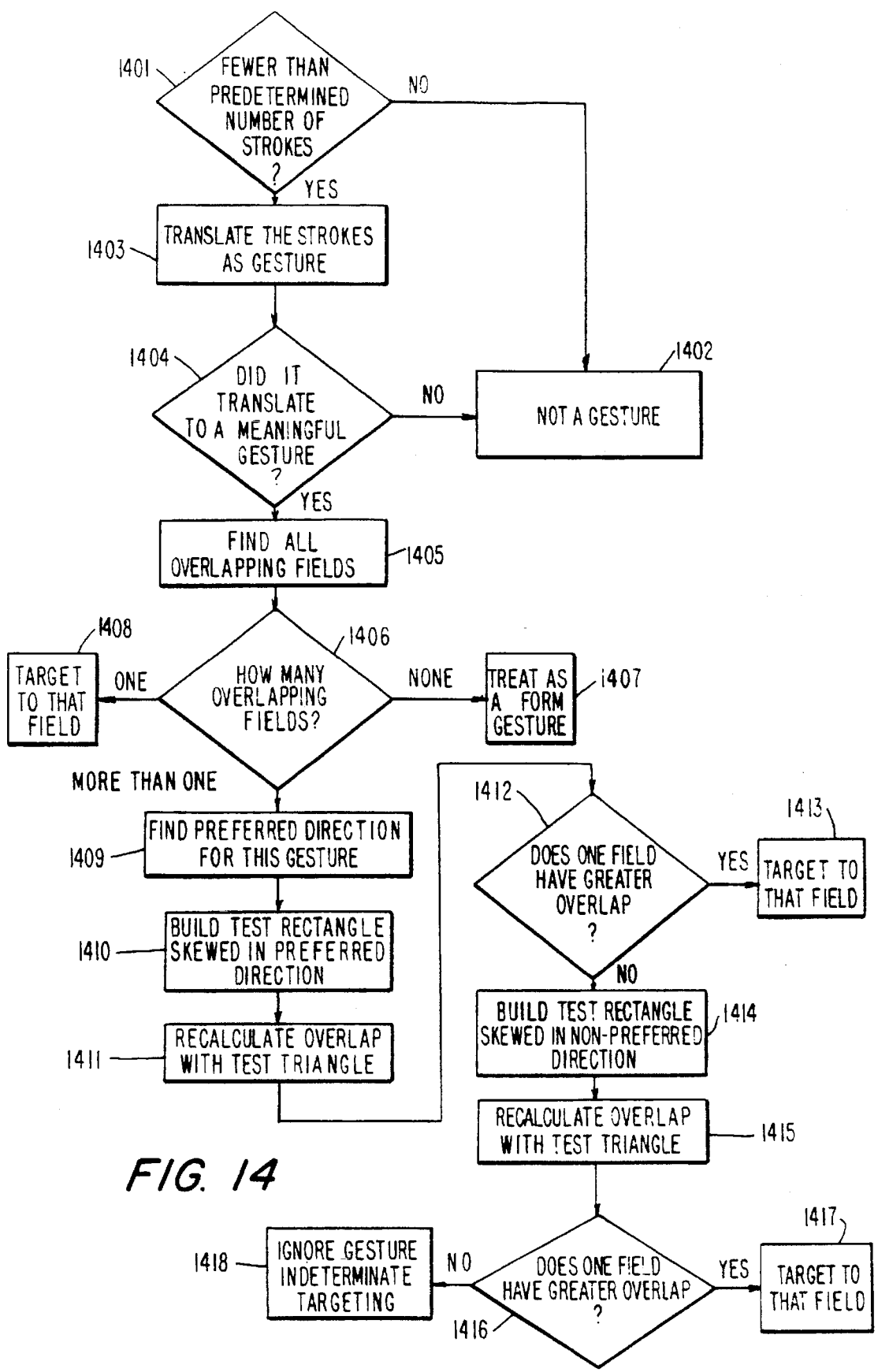
FIG. 14 is a flow diagram illustrating the gesture targeting algorithm of the present invention.

A flow diagram illustrating the targeting of the present invention with respect to gestures is illustrated in FIG. 14. At step 1401, a user makes a gesture on a computer system, the number of strokes on the gesture are determined and the argument "fewer than predetermined number of strokes?" is made at derision block 1401. In the preferred embodiment of the present invention, a gesture is three strokes or fewer. This is for purposes of example only, and other numbers of strokes can be used to describe gestures. If the argument at derision block 1401 is false, the system proceeds to block 1402 and the strokes are identified as something other than a gesture. If the argument at decision block 1401 is true, the system proceeds to step 1403. At step 1403, strokes are translated as a gesture. At decision block 1404, the argument "did it translate to a meaningful gesture?" is made. If the argument is false, that is, if the attempt of the translation of the gesture did not result in a known or understandable gesture, the system proceeds to step 1402 and the strokes are identified as not being a gesture.

If the argument at decision block 1404 is true, the system proceeds to step 1405 and all the overlapping fields of the strokes of the gesture are determined. At decision block 1406, the argument "how many overlapping fields?" is made. If the result of the argument is one field, then the gesture is targeted to that field at step 1408. If there are no overlapping fields, the system proceeds to step 1407 and the gesture is treated as a form gesture. If there is more than one overlapping field, the system proceeds to step 1409. At step 1409, the preferred direction for the particular gesture is determined. There is a preferred direction of operation for each gesture. This direction is stored in a table. For example, for a checkmark, this direction may be down and to the right. At step 1410, a test rectangle skewed in the preferred direction of the gesture is generated. At step 1411, the field overlap is calculated with the test rectangle. At decision block 1412, the argument "does one field have greater overlap?" is made. If the argument at decision block 1412 is true, the system proceeds to step 1413 and that field is defined as the target of the gesture. If the argument at derision block 1412 is false, the system proceeds to step 1414. At step 1414, a test rectangle skewed in the non-preferred direction is built. At step 1415, the overlap of the field of the gesture boundaries with the underlying fields is recalculated. At decision block 1416, the argument "does one field have greater overlap?" is made. If the argument is true, the system proceeds to step 1417 and the gesture is targeted to that field. If the argument at decision block 1416 is false, the gesture is ignored because of indeterminate targeting at step 1418.

Figure 3:
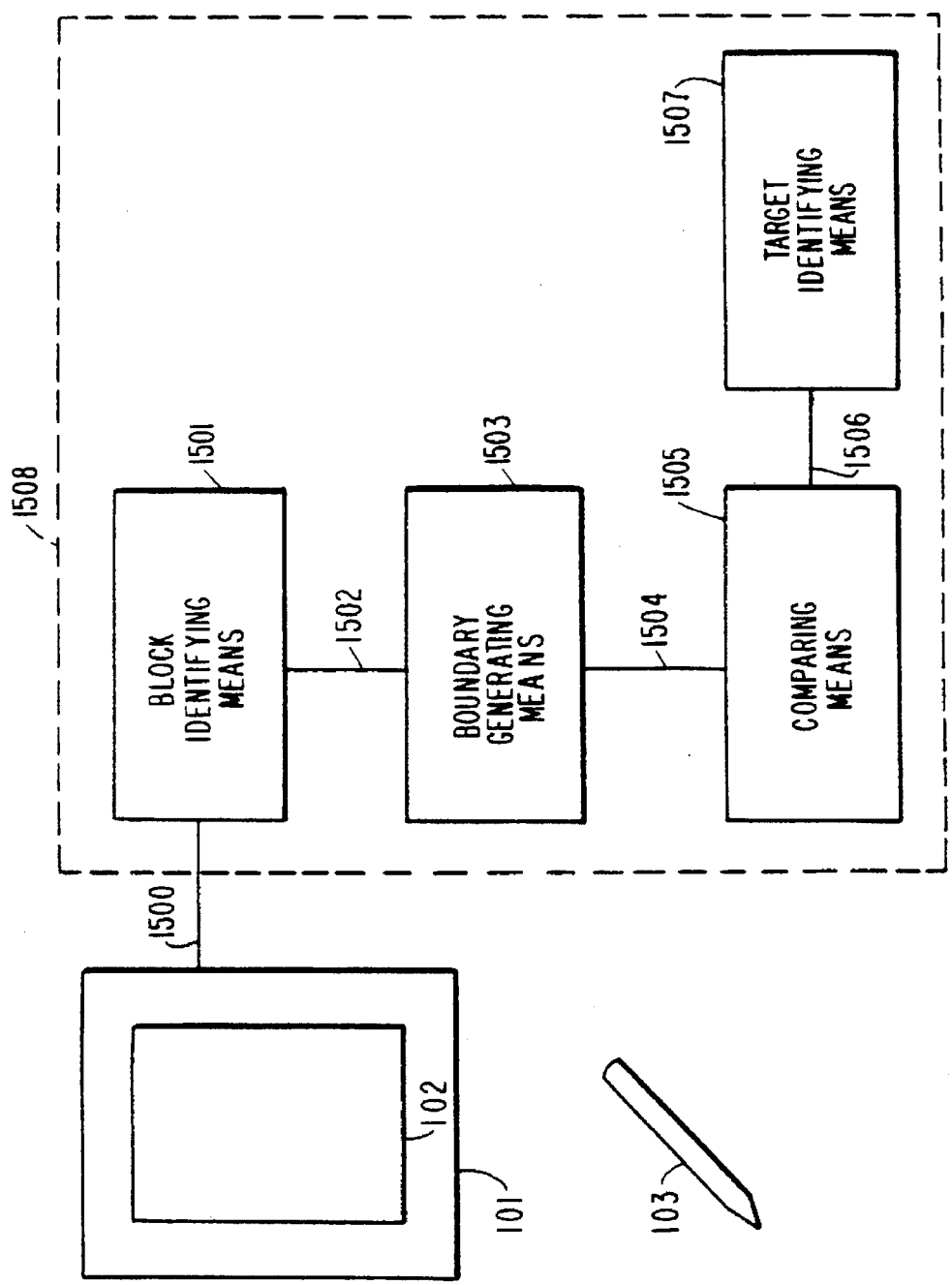
FIG. 3 is a block diagram of the present invention.

A block diagram of the present invention is illustrated in FIG. 3. A writing instrument 103 is used to write data on the display 102 of computer 101. Information about the strokes of data are provided to identifying means 1501 on line 1500. The identifying means 1501 is used to determine blocks of data using the X displacement and Y displacement tests described previously. When a block of data is identified, it is provided on line 1502 to boundary generating means 1503. Boundary generating means 1503 is used to generate a rectangular boundary around the block of data.

The boundary information is provided to comparing means 1505 on line 1504. The comparing means compares the relative overlap of the boundaries of the block of data with the boundaries of potential target fields. The results of the comparison are provided to the target identifying means 1507 on line 1506. The target identifying means 1507 determines the target field based on the results of the comparison.

In the preferred embodiment of the present invention, the blocks within dashed line 1508 of FIG. 15 are implemented as a series of instructions on a microprocessor based computer system. An example of code that can be used to implement the present invention is illustrated in Tables 1, 2 and 3.

Table 1 illustrates code for use in implementing the splitting and targeting schemes of the present invention. Table 2 illustrates code for use in implementing gesture targeting and directional preferences. Table 3 illustrates code for determining whether to append strokes to prior strokes.

Thus, a method and apparatus for implementing a targeting scheme is described.

```
/*------------------------------------------------------------------
File: fvinput.c (C) Copyright 1991 by Slate Corporation, All Rights Reserved.

$Revision:   1.7  $
    $Author:    jfriend  $
    $Date:     02 Oct 1991 09:46:32  $
**------------------------------------------------------------------*/
#include <go.h>
#include <debug.h>
#include <pen.h>
#include <gomath.h>
#include <search.h>
#include <xlist.h>
#include <xlate.h>
#include <scribble.h>
#include <xlfilter.h>
#include <math.h>
#include <key.h>
#include <sel.h>
include <acetate.h> include <padefine.h>
include <formview.h>
#include <formview.loc>
#include <ink.h>
#include <sdc.h>
#include <miscutil.h>
#include <uicache.h>
include <moveque.h> typedef struct
    {
    OBJECT  targetObject;
    RECT32  targetBounds;           // INTL units
    RECT32  targetOverlapRect;      // INTL units
    U32     targetOverlapArea;      // INTL units
    } TARGET_INFO, FAR *P_TARGET_INFO;

STATUS LOCAL FvPenStroke(OBJECT self, P_INPUT_EVENT pArgs, P_INST pData);
STATUS LOCAL FvPenOutProx(OBJECT self, P_INPUT_EVENT pArgs, P_INST pData);
STATUS LOCAL FvPenDown(OBJECT self, P_INPUT_EVENT pArgs, P_INST pData);
STATUS LOCAL FvPenUp(OBJECT self, P_INPUT_EVENT pArgs, P_INST pData);
STATUS LOCAL FvPenTap(OBJECT self, P_INPUT_EVENT pArgs, P_INST pData);
STATUS LOCAL FvTargetByArea(P_DV_LIST pDvList, P_RECT32 pScrBounds, \
    P_TARGET_INFO pTargetArray, U16 lengthArray, P_U16 pNumTargets, U16 eventFlags);
OBJECT LOCAL FindPreference(P_XY32 pHotPoint, U16 direction, \
        U16 preferredDirection, P_TARGET_INFO pTargets, U16 numTargets);
STATUS LOCAL FvDispatchInk(OBJECT self, OBJECT targetObject, P_FV_INST pInst);
void   LOCAL FvOutProxCleanUp(P_FV_INST pInst);
STATUS LOCAL FvCreateTranslator(P_FV_INST pInst);
STATUS LOCAL FvTryGesture(OBJECT self, P_TARGET_INFO pTargets, P_FV_INST pInst, P_INST pData);
void   LOCAL FvGetInkSplit(U16 inkProcessCnt, P_FV_INST pInst);
OBJECT LOCAL FvResolveMultipleTargets(OBJECT ink, P_TARGET_INFO pTargets, U16 numTargets, P_RECT32 pInkBounds);
STATUS LOCAL FvPenHoldTimeout(OBJECT self, P_INPUT_EVENT pArgs, P_INST pData);
STATUS LOCAL FvPenDispatch(OBJECT self, P_INPUT_EVENT pArgs, P_INST pData, U16 fvEventFlags);

#ifdef DEBUG
STATUS LOCAL DrawHotPoint(OBJECT self, X2GESTURE x2Gesture, P_INST pData);
STATUS LOCAL FvLog(P_INPUT_EVENT pArgs, P_INST pData);
#endif

/****************** STATIC DATA **************************/ typedef enum
    {
    PREFER_NEITHER = 0,
    PREFER_LEFT = 1,
    PREFER_RIGHT = 2
    } LEFT_RIGHT_PREFERENCE;

typedef enum
    {
    PREFER_UP = 1,
    PREFER_DOWN = 2
    } UP_DOWN_PREFERENCE;

typedef enum
    {
    PRIMARY_NEITHER = 0,        // defaults to up/down
    PRIMARY_LEFT_RIGHT = 1,     // use left/right first
    PRIMARY_UP_DOWN = 2,        // use up/down
    } PRIMARY_PREFERENCE;

typedef struct
    {
    MESSAGE gesture;
    U8      primaryPref:    2,      // which preference is more important
```

```
            leftRightPref:  2,        // prefer left or right ?
            upDownPref:     2,        // prefer up or down ?
            reserved:       2;        // extra bits
    } GESTURE_PREF, FAR *P_GESTURE_PREF;

/* These are preference directions for gestures when resolving targeting */
/* ties between fields. */
GESTURE_PREF gesturePreferences[] =
    { // gesture           directional pref    left/right         up/down
        {xgsCross,          PRIMARY_NEITHER,   PREFER_NEITHER,    PREFER_NEITHER},
        {xgsUpCaret,        PRIMARY_UP_DOWN,   PREFER_NEITHER,    PREFER_UP},
        {xgsPigtailVert,    PRIMARY_UP_DOWN,   PREFER_LEFT,       PREFER_DOWN},
        {xgsCheck,          PRIMARY_UP_DOWN,   PREFER_RIGHT,      PREFER_DOWN},
        {0}
    };

#define MAX_TARGETS 30      // maximum simultaneous targets

/******************** METHODS ****************************************/
/*---------------------------------------------------------------------
** FvInput
**
** Captures strokes to an ink object and initiates translation.
**-------------------------------------------------------------------*/

MsgHandlerWithTypes(FvInput, P_INPUT_EVENT, P_INST)
    {
    P_FV_INST       pInst;
    INK_ADD_STROKE  addStroke;
    INK_DRAW_INFO   pdi;

//  Dbg(Debugf("Input x,y=%lu,%lu",pArgs->xy.x,pArgs->xy.y););

pInst = pData->pInst;                       // get pointer to heap instance data
//  Dbg5(Debugf("FormView: devCode = %lu", pArgs->devCode));
    Dbg6(FvLog(pArgs, pData));
    if (pInst->state.eraseMode)
        {
        switch(pArgs->devCode)
            {
            case msgPenUp:
            case msgPenExitDown:
                {
                OCall(msgFvDrawEraser, self, pNull);
                break;
                }
            case msgPenOutProxDown:
            case msgPenOutProxUp:
                {
                OSSemaSet(pInst->penUpSema);    // block semaphore
                return(stsInputTerminate);      // stop the grab
                }
            case msgPenDown:
            case msgPenEnterDown:
                {
                OCall(msgFvDrawEraser, self, &pArgs->xy);
                OSSemaReset(pInst->penUpSema);  // release semaphore
                return(stsInputGrabTerminate);  // begin/continue a grab
                }
#ifdef jlf
            case msgPenMoveDown:
                {
                QUE_EVENT           queEvent;

queEvent.pQueData = &pArgs->xy;
                OCall(msgQueAdd, pInst->eraseQue, &queEvent);
                return(stsInputGrabTerminate);  // begin/continue a grab
                }
#endif
            default:
                {
                return(stsInputTerminate);
                }
            }
        }
    else if (pInst->state.annotateMode)
        {
        switch(pArgs->devCode)
            {
            case msgPenStroke:
                {
                addStroke.window = self;
                addStroke.dc = pData->dc;
                addStroke.pStroke = (P_PEN_STROKE)((P_PEN_DATA)(pArgs->eventData))->data;
                OCall(msgInkAddStroke, pData->annotateInk, &addStroke);
                return(stsInputGrabContinue);
                }
            case msgPenDown:
```

32

```
                {
                return(stsInputGrabTerminate);
                }
        case msgPenTimeout:
            {
            pdi.dc = pData->dc;
            pdi.dirtyRect.origin.x = 0;
            pdi.dirtyRect.origin.y = 0;
            pdi.dirtyRect.size.w = maxS32;
            pdi.dirtyRect.size.h = maxS32;
            OCall(msgInkDrawNew, pData->annotateInk, &pdi);
            AcetateClear();
            return(stsInputGrabContinue);
            }
        case msgPenOutProxUp:
        case msgPenOutProxDown:
            {
            pdi.dc = pData->dc;
            pdi.dirtyRect.origin.x = 0;
            pdi.dirtyRect.origin.y = 0;
            pdi.dirtyRect.size.w = maxS32;
            pdi.dirtyRect.size.h = maxS32;
            OCall(msgInkDrawNew, pData->annotateInk, &pdi);
            return(stsInputTerminate);
            }
        default:
            {
            return(stsInputGrabContinue);
            }
        }
    }
else        // not annotating or erasing
    {
    switch(pArgs->devCode)
        {
        case msgPenStroke:
            {
            Dbg5(Debugf("FormView:msgPenStroke"));
            if (pInst->state.ignoreNextStroke)
                {
                pInst->state.ignoreNextStroke = FALSE;
                }
            else
                {
                return(FvPenStroke(self, pArgs, pData));
                }
            break;
            }
        case msgPenUp:
            {
            Dbg5(Debugf("FormView:msgPenUp"));
            return(FvPenDispatch(self, pArgs, pData, fvSendPenUp));
            }
        case msgPenDown:
            {
            OBJECT selection;

Dbg(Warn(MemTestLocal()));
            Dbg5(Debugf("FormView:msgPenDown"));
            OCall(msgSelOwner, theSelectionManager, &selection);
            if (selection != self)
                {
                OCall(msgSelSelect, self, pNull);       // set the selection
                Warn(InputSetTarget(self, inputChar|inputMakeBreak));
                }
            return(FvPenDown(self, pArgs, pData));
            }
        case msgPenOutProxUp:
        case msgPenOutProxDown:
//      case msgPenTimeout:
            {
            Dbg5(Debugf("FormView:msgPenOutProxUp/Down/Timeout"));
            return(FvPenOutProx(self, pArgs, pData));
            break;
            }
        case msgPenHoldTimeout:
            {
            Dbg5(Debugf("FormView:msgPenHoldTimeout"));
            return(FvPenHoldTimeout(self, pArgs, pData));
            break;
            }
        case msgPenTap:
            {
            Dbg5(Debugf("FormView:msgPenTap"));
            return(FvPenTap(self, pArgs, pData));
            break;
            }
        case msgKeyUp:
        case msgKeyDown:
        case msgKeyMulti:
            {
            return(stsOK);
```

```
            }
        case msgKeyChar:
            {
            if (pInst->focus != objNull)
                {
                KEY_MULTI   keyMulti;

memclear(&keyMulti, sizeof(keyMulti));

keyMulti.keyCode     = ((P_KEY_DATA)pArgs->eventData)->keyCode;
                keyMulti.scanCode    = ((P_KEY_DATA)pArgs->eventData)->scanCode;
                keyMulti.shiftState  = ((P_KEY_DATA)pArgs->eventData)->shiftState;
                keyMulti.repeatCount = ((P_KEY_DATA)pArgs->eventData)->repeatCount;

return(OCall(msgDvKey, pInst->focus, &keyMulti));
                }
            break;
            }
        default:
            {
            return(stsInputGrabContinue);
            }
        }
    }
    return(stsInputContinue);
    }                   // end of FvInput
/*-----------------------------------------------------------------------------
** FvSetFocus
**----------------------------------------------------------------------------*/

MsgHandlerWithTypes(FvSetFocus, OBJECT, P_INST)
    {
    if ((pData->pInst->focus != objNull) && (pData->pInst->focus != pArgs))
        {
        OCall(msgDvInputLoseFocus, pData->pInst->focus, pNull);
        }
    if (pData->pInst->focus != pArgs)
        {
        OCall(msgDvInputGetFocus, pArgs, pNull);
        pData->pInst->focus = pArgs;
        }
    return(stsOK);

MsgHandlerParametersNoWarning;
    }                   // end of FvSetFocus

/*-----------------------------------------------------------------------------
** FvPenStroke process an incoming stroke.
**----------------------------------------------------------------------------*/ define MAX_PEN_XDIFF       70  // about 0.50" in pen units (x discontinuity)
define MAX_PEN_YDIFF       35  // about 0.25" in pen units (y discontinuity)
#define MAX_TOP_YDIFF       20  // max diff between tops to disallow split
#define MAX_BOTTOM_YDIFF    20  // max diff between bottoms to disallow split
#define MAX_TAP_W            8  // max w to be a tap
#define MAX_TAP_H            8  // max h to be a tap
#define MAX_OLD_OVERLAP     49  // maximum % overlap with old field before splitting allowed
define MIN_NEW_OVERLAP     51  // maximum % overlap with new field before splitting allowed STATUS LOCAL FvPenStroke(OBJECT self, P_INPUT_EVENT pArgs, P_INST pData)
    {
    STATUS          s;
    P_FV_INST       pInst;
    INK_ADD_STROKE  stroke;
    TARGET_INFO     pTargets[MAX_TARGETS];
    U16             numTargets;
    INK_TRANSLATE   inkUpdate;
    U32             overlap, area;
    RECT32          strokeBoundsINTL, inkBoundsPen, dvInputBounds;
    BOOLEAN         splitStroke, splitDecided;

pInst = pData->pInst;
    /* add the stroke, use the returned bounds */
    stroke.window = self;
    stroke.dc = pData->dc;
    stroke.pStroke = (P_PEN_STROKE)((P_PEN_DATA)(pArgs->eventData))->data;
//  Debugf("FvPenStroke x:%u, y:%u, w:%u, h:%u, cnt:%u, len:%u, pt[len-1]:%u", \
//      stroke.pStroke->bounds.origin.x, stroke.pStroke->bounds.origin.y; \
//      stroke.pStroke->bounds.size.w, stroke.pStroke->bounds.size.h, \
//      stroke.pStroke->count, (U16)stroke.pStroke->info.len, (U16)stroke.pStroke->data[stroke.pStroke->info.len-1]);

OCallRet(msgInkPrepareStroke, pInst->ink, &stroke);

/* check for need to split strokes */

/* algorithm is as follows:
    **      numStrokes > 0    (never split first stroke) &&
    **      initialTarget != 0 (previous strokes have been targeted to something) &&
```

```
**          new stroke > MAX_PEN_XDIFF from last stroke ||
**          new stroke > MAX_PEN_YDIFF from last stroke
**          < MAX_OLD_OVERLAP% of new stroke lies in the old field &&
**          > MIN_NEW_OVERLAP% of new stroke lies in a new field
**
**          Special case, don't split a stroke that looks like a dot
**          and don't split a stroke that looks like the top of an F.
*/
        splitStroke = FALSE;               // assume false
        splitDecided = FALSE;              // init to false
        if ((pInst->numStrokes > 0) && (pInst->initialTarget != objNull))
        {
            /* if there's a discontinuity in the X direction */
            if (labs(stroke.bounds.origin.x - (pInst->lastStrokeBounds.origin.x + \
                pInst->lastStrokeBounds.size.w)) > MAX_PEN_XDIFF)
            {
                splitStroke = TRUE;
                splitDecided = TRUE;
                //FIXME: need to protect against dotting an i or crossing a t
                //       causing an x discontinuity
#ifdef jlf
                OCall(msgInkGetBoundsPen, pInst->ink, &inkBoundsPen);
                if (!((stroke.bounds.origin.x > inkBoundsPen.origin.x) && \
                    ((stroke.bounds.origin.x + stroke.bounds.size.w) < (inkBoundsPen.origin.x + inkBoundsPen.size.w))))
                {
                    Dbg1(Debugf("Allow split: xdiff=%lu, stroke=%d", labs(stroke.bounds.origin.x - (pInst->lastStrokeBounds.
                        pInst->lastStrokeBounds.size.w)), pInst->numStrokes));
                    splitStroke = TRUE;
                    splitDecided = TRUE;
                }
                else
                {
                    //FIXME: when you get here, we need to then apply the Y tests
                    // splitStroke = FALSE;
                    Dbg1(Debugf("No x Split: Contained within x bounds of ink"));
                }
#endif
            }
            /* or if there's a discontinuity in the Y direction */
            if ((splitDecided == FALSE) && \
                (labs(stroke.bounds.origin.y - pInst->lastStrokeBounds.origin.y) > MAX_TOP_YDIFF) && \
                (labs((stroke.bounds.origin.y + stroke.bounds.size.h) - (pInst->lastStrokeBounds.origin.y + pInst->lastStrok
                (labs((stroke.bounds.origin.y + (stroke.bounds.size.h / 2)) - \
                    (pInst->lastStrokeBounds.origin.y + (pInst->lastStrokeBounds.size.h / 2))) > MAX_PEN_YDIFF))
            {
                /* check to see if this stroke is entirely contained within
                ** the y bounds of the ink object so far
                */
                OCall(msgInkGetBoundsPen, pInst->ink, &inkBoundsPen);
                if (!((stroke.bounds.origin.y > inkBoundsPen.origin.y) && \
                    ((stroke.bounds.origin.y + stroke.bounds.size.h) < (inkBoundsPen.origin.y + inkBoundsPen.size.h))))
                {
                    Dbg1(Debugf("Not contained within y bounds: stroke=%d, ydiff=%lu", pInst->numStrokes, \
                        labs((stroke.bounds.origin.y + (stroke.bounds.size.h / 2)) - \
                        (pInst->lastStrokeBounds.origin.y + (pInst->lastStrokeBounds.size.h / 2))));
                    /* if stroke looks like a tap */
                    if ((stroke.bounds.size.w < MAX_TAP_W) && (stroke.bounds.size.h < MAX_TAP_H))
                    {
                        Dbg1(Debugf("Looks like a tap: h=%lu, w=%lu", stroke.bounds.size.h, stroke.bounds.size.w));
                        /* if last stroke was also a tap, then allow this one to split */
                        if ((pInst->lastStrokeBounds.size.w < MAX_TAP_W) && (pInst->lastStrokeBounds.size.h < MAX_TAP_H))
                        {
                            Dbg1(Debugf("Allowing split tap, last stroke was a tap: ydiff"));
                            splitStroke = TRUE;
                        }
                        else
                        {
                            Dbg1(Debugf("No Split: detected tap: h=%lu, w=%lu", stroke.bounds.size.h, stroke.bounds.size.w))
                            // splitStroke = FALSE;
                        }
                    }
                    /* if the stroke is short and wide, then don't split it */
                    /* ALLOW THIS STROKE TO SPLIT IF IT'S EVEN FURTHER AWAY IN THE Y DIRECTION */
                    else if ((stroke.bounds.size.h == 0) || ((stroke.bounds.size.w / stroke.bounds.size.h) < 3))
                    {
                        Dbg1(Debugf("Allowing split horizontal stroke: h=%lu, w=%lu", stroke.bounds.size.h, stroke.bounds.si
                        splitStroke = TRUE;
                    }
                    else
                    {
                        Dbg1(Debugf("No Split: detected horizontal stroke: h=%lu, w=%lu", stroke.bounds.size.h, stroke.bound
                        // splitStroke = FALSE;
                        ;
                    }
                }
                else
                {
                    // splitStroke = FALSE;
                    Dbg1(Debugf("No Split: Contained within y bounds of ink"));
                }
```

```
            }
        else
            {
            // splitStroke = FALSE;
            ;
            }
        }
    else
        {
        // splitStroke = FALSE;
        ;
        }
    if (splitStroke == TRUE)
        {
        /* check if < MAX_OLD_OVERLAP% is in initialTarget */
        strokeBoundsINTL = stroke.bounds;          // get local copy of this
        PENtoINTL_RECT32(&strokeBoundsINTL);       // convert to INTL units
        MakeNonZeroFixedRect(&strokeBoundsINTL);
        OCall(msgDvInputGetBounds, pInst->initialTarget, &dvInputBounds);
        overlap = Rect32OverlapArea(&strokeBoundsINTL, &dvInputBounds);
        area = BrFixedHigh(strokeBoundsINTL.size.w) * BrFixedHigh(strokeBoundsINTL.size.h);
        if ((area != 0) && ((overlap * 100) / area) < MAX_OLD_OVERLAP)
            {
            Dbg1(Debugf("Found < %d%% overlap with initialTarget", MAX_OLD_OVERLAP));
            /* check if > MIN_NEW_OVERLAP% is in newTarget */
            FvTargetByArea(pData->pDvList, &strokeBoundsINTL, pTargets, MAX_TARGETS, &numTargets, fvAllEvents);
            if ((numTargets != 0) && ((pTargets[0].targetOverlapArea * 100) / area) > MIN_NEW_OVERLAP)
                {
                Dbg1(Debugf("Found > %d%% overlap with new Target", MIN_NEW_OVERLAP));
                Dbg1(Debugf("Splitting stroke:%d, h=%lu, w=%lu", pInst->numStrokes, stroke.bounds.size.h, stroke.bounds.s
                /* now xfer the current entry into the array */
                pInst->inkArray[pInst->inkCnt].ink = pInst->ink;
                pInst->inkArray[pInst->inkCnt].numStrokes = pInst->numStrokes;
                pInst->inkArray[pInst->inkCnt].initialTarget = pInst->initialTarget;
                pInst->inkArray[pInst->inkCnt].gTranslator = pInst->gTranslator;
                pInst->inkArray[pInst->inkCnt].tTranslator = pInst->tTranslator;
                ++pInst->inkCnt;                                // count it
                WarnRet(MakeNewInk(self, pData->dc, &pInst->ink));   // make a new one /* clear out the current stuff */
                pInst->numStrokes = 0;
                pInst->gTranslator = objNull;
                pInst->tTranslator = objNull;
                pInst->initialTarget = objNull;

pInst->grabber = objNull;    // clear grabber
                }
            else
                {
                Dbg1(Debugf("Failed > %d%% overlap with new Target", MIN_NEW_OVERLAP));
                }
            }
        else
            {
            Dbg1(Debugf("Failed < %d%% overlap with initialTarget", MAX_OLD_OVERLAP));
            }
        }
    /* create the gesture translator if it doesn't already exist */
    if ((pInst->gTranslator == objNull) && (pInst->numStrokes == 0))
        {
        WarnJmp(CreateDefaultObject(clsXGesture, &pInst->gTranslator), ERROR);
        OCall(msgAddObserver, pInst->ink, pInst->gTranslator);
ERROR:
        ;
        }

/* only send a certain number of strokes to the gesture translator */
    if ((pInst->numStrokes >= MAX_GESTURE_STROKES) && (pInst->gTranslator != objNull))
        {
        OCall(msgRemoveObserver, pInst->ink, pInst->gTranslator);
        OPostU32(msgDestroy, pInst->gTranslator, pNull);
        pInst->gTranslator = objNull;
        } pInst->lastStrokeBounds = stroke.bounds;     // remember last stroke bounds
    OCallRet(msgInkPutStroke, pInst->ink, &stroke);
    ++pInst->numStrokes;
    if (pInst->initialTarget == objNull)         // if no initialTarget yet
        {
        PENtoINTL_RECT32(&stroke.bounds);        // convert to INTL units
        MakeNonZeroFixedRect(&stroke.bounds);
        FvTargetByArea(pData->pDvList, &stroke.bounds, pTargets, MAX_TARGETS, &numTargets, fvAllEvents);
        Dbg1(Debugf("Number of Initial Targets = %u", numTargets));
        if (numTargets != 0)
            {
            pInst->initialTarget = pTargets[0].targetObject;
            s = OCallNo(msgDvCreateTranslator, pInst->initialTarget, &pInst->tTranslator);
            if ((s == stsOK) && (pInst->tTranslator != objNull))
                {
                OCall(msgAddObserver, pInst->ink, pInst->tTranslator);
                inkUpdate.translateType = INK_TRANSLATE_ALL;    // all strokes so far
                inkUpdate.window = self;
```

```
                inkUpdate.translator = pInst->tTranslator;        // to the new translator
                /* send all strokes so far to the translator */
                OCall(msgInkUpdateTranslator, pInst->ink, &inkUpdate);
                }
        else        // no targets
            {
            /* look for proximity to a target */
            }
        }
    return(stsInputGrabTerminate);
    }                    // end of FvPenStroke
//targeting constants
#define MAX_Y_SAMELINE  BrMakeFixed(20,0)
/*-------------------------------------------------------------------------
** FvPenOutProx
**-------------------------------------------------------------------------*/
STATUS LOCAL FvPenOutProx(OBJECT self, P_INPUT_EVENT pArgs, P_INST pData)
    {
    STATUS          s, gStatus;
    P_FV_INST       pInst;
    RECT32          strokeBounds;
    TARGET_INFO     pTargets[MAX_TARGETS];
    U16             numTargets, inkProcessCnt, index;
    OBJECT          targetObject;
    INK_MOVE        inkMove;
    INK_TRANSLATE   inkTranslate;
    OBJECT          grabber;

pInst = pData->pInst;
    grabber = pInst->grabber;           // remember grabber
    pInst->grabber = objNull;           // clear grabber
    if (pInst->numStrokes == 0)         // if no strokes
        {
        pInst->initialTarget = objNull;
        return(stsInputTerminate);
        }

/* put the last ink object into the array */
    pInst->inkArray[pInst->inkCnt].ink = pInst->ink;
    pInst->inkArray[pInst->inkCnt].numStrokes = pInst->numStrokes;
    pInst->inkArray[pInst->inkCnt].initialTarget = pInst->initialTarget;
    pInst->inkArray[pInst->inkCnt].gTranslator = pInst->gTranslator;
    pInst->inkArray[pInst->inkCnt].tTranslator = pInst->tTranslator;
    ++pInst->inkCnt;                    // count it
    Dbg1(Debugf("Number of splits = %u", pInst->inkCnt - 1));

/* now we want to process each of the split ink objects starting */
    /* with the first one chronologically */

/* first process the gestures and target the text items */
    for (inkProcessCnt = 0; inkProcessCnt < pInst->inkCnt; ++inkProcessCnt)
        {
        /* move next item out of the array into the current variables */
        FvGetInkSplit(inkProcessCnt, pInst);

gStatus = stsFailed;            // assume failed
        if (grabber != objNull)
            {
            gStatus = OCallNo(msgDvInkRaw, grabber, pInst->ink);
            if (gStatus == stsOK)
                {
                pInst->inkArray[inkProcessCnt].finalTarget = objNull;
                }
            } if (gStatus != stsOK)
            {
            /* see if this ink object is a gesture */
            gStatus = FvTryGesture(self, pTargets, pInst, pData);
            if (gStatus == stsOK)
                {
                pInst->inkArray[inkProcessCnt].finalTarget = objNull;
                }
            else        // if not processed as a gesture
                {
                OCall(msgInkGetBoundsINTL, pInst->ink, &strokeBounds);   // get INTL bounds
                FvTargetByArea(pData->pDvList, &strokeBounds, pTargets, MAX_TARGETS, &numTargets, fvAllEvents);
                if (numTargets == 0)
                    {
                    // look for possibility of append here
                    pInst->inkArray[inkProcessCnt].finalTarget = objNull;
                    Dbg1(Debugf("No Targets"));
                    }
                else if (numTargets == 1)           // 1 target
                    {
                    pInst->inkArray[inkProcessCnt].finalTarget = pTargets[0].targetObject;
                    }
```

```
                else            // multiple targets
                    {
                    /* Now sum the overlap on a stroke by stroke basis
                    ** for each potential target
                    */
                    pInst->inkArray[inkProcessCnt].finalTarget = FvResolveMultipleTargets(pInst->ink, pTargets, numTargets
                    }
                }
            }

/* now combine any ink objects that target to the same object */
    for (inkProcessCnt = 0; inkProcessCnt < pInst->inkCnt; ++inkProcessCnt)
        {
        targetObject = pInst->inkArray[inkProcessCnt].finalTarget;
        if (targetObject != objNull)
            {
            /* look for others with the same target object */
            for (index = inkProcessCnt + 1; index < pInst->inkCnt; ++index)
                {
                if (pInst->inkArray[index].finalTarget == targetObject)
                    {
                    /* combine these strokes with the first ink object
                    ** and then destroy this ink object
                    */
                    inkMove.destObject = pInst->inkArray[inkProcessCnt].ink;
                    inkMove.firstStroke = 0;
                    inkMove.lastStroke = maxU16;
                    OCallJmp(msgInkMoveStrokes, pInst->inkArray[index].ink, &inkMove, ERROR);

/* if initialTarget's translator was correct,
                    **       send the new strokes to the translator
                    */
                    if (pInst->inkArray[inkProcessCnt].initialTarget = pInst->inkArray[inkProcessCnt].finalTarget)
                        {
                        inkTranslate.translator = pInst->inkArray[inkProcessCnt].tTranslator;
                        inkTranslate.translateType = INK_TRANSLATE_PARTIAL;
                        inkTranslate.firstStroke = inkMove.firstStrokeAdded;
                        inkTranslate.lastStroke = maxU16;
                        inkTranslate.window = self;
                        OCall(msgInkUpdateTranslator, pInst->inkArray[inkProcessCnt].ink, &inkTranslate);
                        }
                    OPostU32(msgDestroy, pInst->inkArray[index].ink, pNull);
                    pInst->inkArray[index].ink = objNull;
                    pInst->inkArray[index].finalTarget = objNull;
ERROR:
                    ;
                    }
                }
            }
        } for (inkProcessCnt = 0; inkProcessCnt < pInst->inkCnt; ++inkProcessCnt)
        {
        /* move next item out of the array into the current variables */
        FvGetInkSplit(inkProcessCnt, pInst);
        if (pInst->inkArray[inkProcessCnt].finalTarget != objNull)
            {
            Warn(FvDispatchInk(self, pInst->inkArray[inkProcessCnt].finalTarget, pInst));
            }

FvOutProxCleanUp(pInst);

if (pInst->ink != objNull)
            {
            OPostU32(msgDestroy, pInst->ink, pNull);
            pInst->ink = objNull;
            }
        } pInst->inkCnt = 0;                              // init

/* cleanup everything now */
    /* if ink object still exists, clear it */
    if (pInst->ink != objNull)
        {
        OCall(msgInkClear, pInst->ink, pNull);      // clear the ink
        }
    else    // make a new ink object
        {
        Warn(MakeNewInk(self, pData->dc, &pInst->ink));
        }
    pInst->initialTarget = objNull;
    return(stsInputTerminate);
    }                       // end of FvPenOutProx
/*-----------------------------------------------------------------------
** FvPenDown responds to pen down when not annotating.
**---------------------------------------------------------------------*/
STATUS LOCAL FvPenDown(OBJECT self, P_INPUT_EVENT pArgs, P_INST pData)
    {
```

```
STATUS          s;
P_FV_INST       pInst;
U16             numTargets;
TARGET_INFO     pTargets[1];
RECT32          downPt;
DVINPUT_EVENT   dvInputEvent;
BOOLEAN         eventSent = FALSE;

pInst = pData->pInst;

/* if no grabber yet and no initial target yet,
** check for a grabber.
*/
if (pInst->grabber != objNull)
    {
    dvInputEvent.pInputEvent = pArgs;            // ptr to the input event
    dvInputEvent.inkObject = pInst->ink;         // pass the current ink object
    dvInputEvent.origin = pArgs->xy;
    OCall(msgSdcLWCtoINTL_XY32, pData->dc, &dvInputEvent.origin);
    s = OCall(msgDvInputEvent, pInst->grabber, &dvInputEvent);
    eventSent = TRUE;
    }
else if (pInst->initialTarget == objNull)
    {
    downPt.origin = pArgs->xy;
    OCall(msgSdcLWCtoINTL_XY32, pData->dc, &downPt.origin);
    downPt.size.w = downPt.size.h = 0x10000;
    FvTargetByArea(pData->pDvList, &downPt, pTargets, 1, &numTargets, fvSendPenDown);
    if (numTargets == 1)
        {
        dvInputEvent.pInputEvent = pArgs;            // ptr to the input event
        dvInputEvent.origin = downPt.origin;         // location of this event
        dvInputEvent.inkObject = pInst->ink;         // pass the current ink object
        s = OCall(msgDvInputEvent, pTargets[0].targetObject, &dvInputEvent);
        OCall(msgFvSetFocus, self, pTargets[0].targetObject);
        eventSent = TRUE;
        }
    } if (eventSent)
    {
    switch(s)
        {
        case stsDvInputBeginGrab:
            {
            pInst->grabber = pTargets[0].targetObject;
            break;
            }
        case stsDvInputTerminateAndForward:
        case stsDvInputTerminateGrab:
            {
            pInst->grabber = objNull;
            pInst->initialTarget = objNull;
            break;
            }
        case stsDvInputIgnore:
        case stsDvInputContinue:
        case stsOK:
        default:
            {
            break;
            }
        }
    }
return(stsInputGrabTerminate);
}                    // end of FvPenDown
/*------------------------------------------------------------------------
** FvPenTap
**----------------------------------------------------------------------*/
STATUS LOCAL FvPenTap(OBJECT self, P_INPUT_EVENT pArgs, P_INST pData)
    {
    P_FV_INST       pInst;
    U16             numTargets;
    TARGET_INFO     pTargets[1];
    RECT32          downPt;
    DVINPUT_EVENT   dvInputEvent;

pInst = pData->pInst;

downPt.origin = pArgs->xy;
    OCall(msgSdcLWCtoINTL_XY32, pData->dc, &downPt.origin);
    downPt.size.w = downPt.size.h = 0x10000;
    FvTargetByArea(pData->pDvList, &downPt, pTargets, 1, &numTargets, fvSendPenTap);
    if (numTargets == 1)
        {
        dvInputEvent.pInputEvent = pArgs;            // ptr to the input event
        dvInputEvent.origin = downPt.origin;         // location of this event
        dvInputEvent.inkObject = pInst->ink;         // pass the current ink object
        OCall(msgDvInputEvent, pTargets[0].targetObject, &dvInputEvent);
        OCall(msgFvSetFocus, self, pTargets[0].targetObject);
```

```
        )
    return(stsInputGrabTerminate);
    }                           // end of FvPenTap /*---------------------------------------------------------------------------
** FvResolveMultipleTargets is called to resolve multiple targets.
**
** It first checks to see if there is significant overlap with more
** than one target. If not, just return the significant one.
**
** If it is ambiguous, then calc the overlap on a stroke by stroke
** basis with each individual stroke. This should remove the
** overly heavy impact on the whole stroke bounds that one descender
** can have.
**---------------------------------------------------------------------------*/ define MIN_OBVIOUS_OVERLAP 70  // % overlap that is obvious

OBJECT LOCAL FvResolveMultipleTargets(OBJECT ink, P_TARGET_INFO pTargets, U16 numTargets, P_RECT32 pInkBounds)
    {
    U16             index, strokeIndex, strokeCnt, maxIndex;
    U32             cumOverlap[MAX_TARGETS];    // array of overlaps
    U32             inkArea, maxOverlap;
    INK_STROKE_BOUNDS  strokeBounds;

//FIXME: treat X targets differently than Y targets
    Dbg2(Debugf("Resolving Multiple Targets"));
    inkArea = BrFixedHigh(pInkBounds->size.w) * BrFixedHigh(pInkBounds->size.h);
    if (((pTargets[0].targetOverlapArea * 100) / inkArea) > MIN_OBVIOUS_OVERLAP)
        {
        Dbg2(Debugf("Found a target with > %d%% overlap", MIN_OBVIOUS_OVERLAP));
        return(pTargets[0].targetObject);
        }
    memclear(cumOverlap, sizeof(U32) * MAX_TARGETS);   // init the array
    OCall(msgInkCount, ink, &strokeCnt);               // get number of strokes
    strokeBounds.units = INK_UNITS_INTL;               // use INTL units
    for (strokeIndex = 0; strokeIndex < strokeCnt; ++strokeIndex)
        {
        strokeBounds.strokeNum = strokeIndex;
        OCall(msgInkGetStrokeBounds, ink, &strokeBounds);
        for (index = 0; index < numTargets; ++index)
            {
            cumOverlap[index] += Rect32OverlapArea(&strokeBounds.bounds, &pTargets[index].targetBounds);
            }
        }
    /* now find the greatest overlap */
    maxOverlap = 0;
    for (index = 0; index < numTargets; ++index)
        {
        if (cumOverlap[index] > maxOverlap)
            {
            maxOverlap = cumOverlap[index];
            maxIndex = index;
            }
        }
    if (maxOverlap == 0)
        {
        return(objNull);
        }
    else
        {
        return(pTargets[maxIndex].targetObject);
        }
    }                           // end of FvResolveMultipleTargets /*---------------------------------------------------------------------------
** FvTryGesture returns stsOK if it was processed as a gesture otherwise
** returns stsFailed.
**---------------------------------------------------------------------------*/

STATUS LOCAL FvTryGesture(OBJECT self, P_TARGET_INFO pTargets, P_FV_INST pInst, P_INST pData)
    {
    STATUS             s;
    DVINPUT_GESTURE    dvGesture;
    INK_TRANSLATE      inkTranslate;
    U16                numTargets;
    RECT32             hotPointBounds;
    X2GESTURE          x2Gesture, osGesture;
    P_GESTURE_PREF     pGesturePref;
    OBJECT             targetObject;
    STATUS             gStatus;
    RECT32             strokeBounds;

gStatus = stsFailed;                                // assume gesture not processed
    x2Gesture.msg = xgsNull;                            // init to null
    if (pInst->numStrokes < MAX_GESTURE_STROKES)        // if could be a gesture
        {
        /* translate the gesture */
        if (pInst->gTranslator != objNull)
            {
```

```
        inkTranslate.translateType = INK_TRANSLATE_FINISH;   // just the rest of the strokes
        }
    else    // create it and send all the strokes
        {
        WarnJmp(FvCreateGTranslator(pInst), ERROR1);        // create gesture translator
        inkTranslate.translateType = INK_TRANSLATE_ALL;     // all strokes
        }
    inkTranslate.translator = pInst->gTranslator;
    inkTranslate.window = self;
    inkTranslate.client = objNull;
    OCallJmp(msgInkTranslate, pInst->ink, &inkTranslate, ERROR1);   // translate gesture /* now turn the xlist into a gesture */
    XList2Gesture(inkTranslate.pXList, &x2Gesture);
    XListFree(inkTranslate.pXList);         // free up the heap space
ERROR1:
    if (x2Gesture.msg == xgsNull)           // if didn't translate as a gesture
        {
        return(stsFailed);                  // return error
        }
    osGesture = x2Gesture;
    /* convert hotpoint units to INTL */
    OCall(msgInkGetBoundsINTL, pInst->ink, &strokeBounds);   // get INTL bounds
    PEN1toINTL4_XY32(&x2Gesture.hotPoint, pInst->windowHeight);

Dbg0(DrawHotPoint(self, x2Gesture, pData));

/* now target the gesture to a field */
    hotPointBounds.origin = x2Gesture.hotPoint;
    hotPointBounds.size.w = hotPointBounds.size.h = BrMakeFixed(1,0);
    dvGesture.gesture = x2Gesture.msg;
    dvGesture.hotPoint = x2Gesture.hotPoint;
    dvGesture.bounds = strokeBounds;
    dvGesture.pExtra = pNull;

/* check for overlap with fields, return list of overlapped fiels in pTargets */
    FvTargetByArea(pData->pDvList, &hotPointBounds, pTargets, MAX_TARGETS, &numTargets, fvAllEvents);

targetObject = objNull;

/* if no overlap, treat it as a form gesture */
    if (numTargets == 0)
        {
        /* convert from 1st quadrant pen units to 1st quadrant device units */
        PENtoLWC_SIZE32((P_SIZE32)&osGesture.bounds.origin);
        PENtoLWC_SIZE32(&osGesture.bounds.size);
        PENtoLWC_SIZE32((P_SIZE32)&osGesture.hotPoint);
        gStatus = OCall(msgFvGesture, self, &osGesture);
        }

/* one unique target */
    else if (numTargets == 1)
        {
        gStatus = OCall(msgDvInputGesture, pTargets[0].targetObject, &dvGesture);
        targetObject = pTargets[0].targetObject;
        }

/* multiple targets */
    else    // numTargets > 1
        {

Dbg1(Debugf("Multiple targets on gesture targeting"));

/* look through the whole table */
        for (pGesturePref = gesturePreferences; pGesturePref->gesture != 0; ++ pGesturePref)
            {
            if (pGesturePref->gesture == dvGesture.gesture)     // if gesture matches
                {

/* if preferred direction = left/right */
                if (pGesturePref->primaryPref == PRIMARY_LEFT_RIGHT)
                    {
                    targetObject = FindPreference(&dvGesture.hotPoint,
                        PRIMARY_LEFT_RIGHT, pGesturePref->leftRightPref,
                        pTargets, numTargets);
                    if (targetObject == objNull)        // if still tied, try up/down
                        {
                        targetObject = FindPreference(&dvGesture.hotPoint,
                            PRIMARY_UP_DOWN, pGesturePref->upDownPref,
                            pTargets, numTargets);
                        }
                    }

/* preferred direction = up/down */
                else if (pGesturePref->primaryPref == PRIMARY_UP_DOWN)
                    {
                    targetObject = FindPreference(&dvGesture.hotPoint,
                        PRIMARY_UP_DOWN, pGesturePref->upDownPref,
                        pTargets, numTargets);
                    if (targetObject == objNull)        // if still tied, try right/left
                        {
                        targetObject = FindPreference(&dvGesture.hotPoint,
```

```
                            PRIMARY_LEFT_RIGHT, pGesturePref->leftRightPref,
                            pTargets, numTargets);
                }
            }
            /* no direction preferred */
            else     // default, no directional preference
            {
                // targetObject remains null
                Dbg1(Debugf("No Preference: Ambiglous: No target Resulted"));
                targetObject = objNull;
            }
            if (targetObject != objNull)
            {
                gStatus = OCall(msgDvInputGesture, targetObject, &dvGesture);
            }
            break;
        }
    }
    if (targetObject != objNull)
    {
        pInst->selection = targetObject;
        OCall(msgSelSelect, self, argNull);     // reset set the selection
    }
    return(gStatus);
}                        // end of FVTryGesture
/*-----------------------------------------------------------------------
** CompareOverlapArea compares two TARGET_INFO structs to see which
** has a greater overlap area.  It returns the opposite of what you might
** expect for the qsort documentation because I want the array sorted
** from highest to lowest rather than the other way around.
**---------------------------------------------------------------------*/ int _CDECL CompareOverlapArea(P_TARGET_INFO pItem1, P_TARGET_INFO pItem2)
{
    if (pItem1->targetOverlapArea > pItem2->targetOverlapArea)
    {
        return(-1);
    }
    else if (pItem1->targetOverlapArea < pItem2->targetOverlapArea)
    {
        return(1);
    }
    else
    {
        return(0);      // must be equal
    }
}                        // end of CompareOverlapArea /*-----------------------------------------------------------------------
** FVTargetByArea finds all overlapping dataviews.  It returns an array
** of the overlapping dataviews sorted in overlap order from greatest
** overlap to lowest overlap.
**
** If there are more overlapping dataviews than will fit in the
** array, only the highest overlap ones are returned.
**
** This function only looks at dataviews that have at least one of
** the passed in eventFlags.
**---------------------------------------------------------------------*/

STATUS LOCAL FVTargetByArea(P_DV_LIST pDvList, P_RECT32 pScrBounds,
    P_TARGET_INFO pTargetArray, U16 lengthArray, P_U16 pNumTargets, U16 eventFlags)
{
    U16     dvIndex, testIndex, matchIndex, arrayCnt;
    U32     overlapArea, minOverlapArea;
    RECT32  overlapRect;

arrayCnt = 0;                // init
    for (dvIndex = 0; dvIndex < pDvList->dvCnt; ++dvIndex)
    {
        /* if valid UID and there is overlap */
        if ((pDvList->dvList[dvIndex].inputEvents & eventFlags != 0) &&
            (pDvList->dvList[dvIndex].flags.visible) &&
            (!pDvList->dvList[dvIndex].flags.readOnly) &&
            (pDvList->dvList[dvIndex].dv != objNull) &&
            (Rect32Intersect(&pDvList->dvList[dvIndex].inputBounds, pScrBounds, &overlapRect)))
        {
            /* calculate the area of the overlap */
            overlapArea = BrFixedHigh(overlapRect.size.w) * BrFixedHigh(overlapRect.size.h);
            if (arrayCnt < lengthArray)   // if room in the array
            {
                pTargetArray[arrayCnt].targetObject = pDvList->dvList[dvIndex].dv;
                pTargetArray[arrayCnt].targetBounds = pDvList->dvList[dvIndex].inputBounds;
                pTargetArray[arrayCnt].targetOverlapRect = overlapRect;
                pTargetArray[arrayCnt].targetOverlapArea = overlapArea;
                ++arrayCnt;
            }
```

```
        else        // not room in the array, replace the lowest overlap entry
            {
            minOverlapArea = maxU32;

/* find the smallest overlap entry */
            for (testIndex = 0; testIndex < arrayCnt; ++testIndex;)
                {
                if (pTargetArray[testIndex].targetOverlapArea < minOverlapArea)
                    {
                    matchIndex = testIndex;        // remember the index
                    minOverlapArea = pTargetArray[testIndex].targetOverlapArea; // remember the overlap
                    }
                }
            /* if this new overlap is lower than the lowest in the array */
            /* replace the lowest with this one */
            if (overlapArea > minOverlapArea)
                {
                pTargetArray[matchIndex].targetObject = pDvList->dvList[dvIndex].dv;
                pTargetArray[matchIndex].targetBounds = pDvList->dvList[dvIndex].inputBounds;
                pTargetArray[matchIndex].targetOverlapRect = overlapRect;
                pTargetArray[matchIndex].targetOverlapArea = overlapArea;
                }
            }
        }
    }

/* now sort the array by overlapArea */
    if (arrayCnt > 1)
        {
        qsort(pTargetArray, arrayCnt, sizeof(TARGET_INFO), CompareOverlapArea);
        }
    *pNumTargets = arrayCnt;

return(stsOK);

}                    // end of FvTargetByArea
/*-----------------------------------------------------------------------
** FvTargetPoint finds which visible dv overlaps a point.
**---------------------------------------------------------------------*/
STATUS GLOBAL FvTargetPoint(P_XY32 pPoint, P_DV_LIST pDvList, P_OBJECT pObject, U16 fvEvents)
    {
    RECT32          rect;
    U16             numTargets;
    TARGET_INFO     targetInfo;

rect.origin = *pPoint;
    rect.size.h = rect.size.w = 0x10000;
    *pObject = objNull;     // assume no match
    FvTargetByArea(pDvList, &rect, &targetInfo, 1, &numTargets, fvEvents);
    if (numTargets == 1)
        {
        *pObject = targetInfo.targetObject;
        }
    return(stsOK);
    }                    // end of FvTargetPoint /*-----------------------------------------------------------------------
** FindPreference tests the array of overlapped fields against the
** preferred directions, to find the overlapped field with the greatest
** preference.
**---------------------------------------------------------------------*/
#define PREFERENCE_MARGIN 0x50000

OBJECT LOCAL FindPreference(P_XY32 pHotPoint, U16 direction,
        U16 preferredDirection, P_TARGET_INFO pTargets, U16 numTargets)
    {
    RECT32   testRect;
    U16      index;
    U32      highestOverlap, currentOverlap;
    OBJECT   targetObject;

/* build a test rect around the hotpoint */
    testRect.origin.x = pHotPoint->x - PREFERENCE_MARGIN;
    testRect.origin.y = pHotPoint->y - PREFERENCE_MARGIN;
    testRect.size.h = 2 * PREFERENCE_MARGIN;
    testRect.size.w = 2 * PREFERENCE_MARGIN;

/* now, skew the test rect in the preferred direction */
    if (direction == PRIMARY_LEFT_RIGHT)
        {
        Dbg1(Debugf("Direction = Left/Right"));
        if (preferredDirection == PREFER_LEFT)
            {
            Dbg1(Debugf("Prefer Left"));
            testRect.origin.x -= PREFERENCE_MARGIN; // skew rect to the left
            }
        else if (preferredDirection == PREFER_RIGHT)
            {
```

```
            Dbgl(Debugf("Prefer Right"));
            testRect.origin.x += PREFERENCE_MARGIN; // skew rect to the right
            }
        else
            {
            return(objNull);
            }
        }
    else if (direction == PRIMARY_UP_DOWN)
        {
        Dbgl(Debugf("Direction = Up/Down"));
        if (preferredDirection == PREFER_UP)
            {
            Dbgl(Debugf("Prefer Up"));
            testRect.origin.y -= PREFERENCE_MARGIN; // skew rect up
            }
        else if (preferredDirection == PREFER_DOWN)
            {
            Dbgl(Debugf("Prefer Down"));
            testRect.origin.y += PREFERENCE_MARGIN; // skew rect down
            }
        else
            {
            return(objNull);
            }
        }
    else        // no preferred direction
        {
        return(objNull);
        }
    /* testRect is now a rect that should be tested for max overlap */
    /* with every overlapped field, return the field with the highest overlap */
    targetObject = objNull;             // init
    highestOverlap = 0;                 // init
    for (index = 0; index < numTargets; ++index)
        {
        currentOverlap = Rect32OverlapArea(&pTargets[index].targetBounds, &testRect);
        if (currentOverlap > highestOverlap)
            {
            Dbgl(Debugf("Overlap = %lu", currentOverlap));
            highestOverlap = currentOverlap;
            targetObject = pTargets[index].targetObject;
            }
        }
    Dbgl(Debugf("Found Target"));
    return(targetObject);
    }                       // end of FindPreference ifdef DEBUG
/*-----------------------------------------------------------------
** DrawHotPoint draws the hotpoint
**---------------------------------------------------------------*/
STATUS LOCAL DrawHotPoint(OBJECT self, X2GESTURE x2Gesture, P_INST pData)
    {
    /* draw a + over the hotpoint */
    SYSDC_POLYLINE  polyLine;
    XY32            points[2];
    RECT32          gBounds;
    P_FV_INST       pInst;

pInst = pData->pInst;
    OCall(msgWinBeginPaint, self, pNull);
    polyLine.count = 2;
    polyLine.points = points;

points[0].x = x2Gesture.hotPoint.x - 0x50000;
    points[1].x = x2Gesture.hotPoint.x + 0x50000;
    points[0].y = x2Gesture.hotPoint.y;
    points[1].y = x2Gesture.hotPoint.y;
    OCall(msgDcDrawPolyline, pData->dc, &polyLine);

points[0].x = x2Gesture.hotPoint.x;
    points[1].x = x2Gesture.hotPoint.x;
    points[0].y = x2Gesture.hotPoint.y - 0x50000;
    points[1].y = x2Gesture.hotPoint.y + 0x50000;
    OCall(msgDcDrawPolyline, pData->dc, &polyLine);
    OCallNo(msgDcSetFillPat, pData->dc, (P_ARGS)sysDcPatNil);
//  OCall(msgSdcDrawRectangle, pData->dc, &strokeBounds);
    gBounds = x2Gesture.bounds;
    PENltoINTL4_RECT32(&gBounds, pInst->windowHeight);
    OCall(msgDcDrawRectangle, pData->dc, &gBounds);

OCall(msgWinEndPaint, self, pNull);
    return(stsOK);
    }                       // end of DrawHotPoint
#endif
/*-----------------------------------------------------------------
** FVDispatchInk
**---------------------------------------------------------------*/
```

```
STATUS LOCAL FvDispatchInk(OBJECT self, OBJECT targetObject, P_FV_INST pInst)
{
    STATUS          s;
    INK_TRANSLATE   inkTranslate;
    X2STRING        x2String;
    char            text[2048];
    DV_DATA_SET     dataSet;
    DV_DESIRE       dvDesire;

// init
    dataSet.pString         = text;
    dataSet.ink             = pInst->ink;
    dataSet.fromUser        = TRUE;
    dataSet.drawInkIfVisible = TRUE;
    dataSet.inkVisible      = FALSE;
    pInst->selection = targetObject;
    OCall(msgSelSelect, self, argNull);    // reset set the selection
    dvDesire.ink            = dataSet.ink;
    dvDesire.appendStatus   = FALSE;
    dvDesire.desireStatus   = DV_DESIRE_NONE;
    dvDesire.originalInk    = objNull;
    OCallNoJmp(msgDvDesireText, targetObject, &dvDesire, ERROR3);
    if (dvDesire.desireStatus == DV_DESIRE_INK)
    {
        if (dvDesire.appendStatus == TRUE)
        {
            OCall(msgInkCombine, dvDesire.ink, dvDesire.originalInk);
            OPostU32(msgDestroy, dvDesire.ink, pNull);    // destroy new, empty ink object
            dataSet.ink = dvDesire.originalInk;
            pInst->ink = objNull;                          // clear this
        }
        dataSet.pString = pNull;
        s = OCall(msgDvDataSet, targetObject, &dataSet);
        if (s != stsOK)
        {
            OPostU32(msgDestroy, pInst->ink, pNull);    // destroy the ink
        }
        pInst->ink = objNull;
    }
    else if (dvDesire.desireStatus == DV_DESIRE_TEXT)
    {
        if (dvDesire.appendStatus == TRUE)
        {
            OCall(msgInkCombine, dvDesire.ink, dvDesire.originalInk);
            OPostU32(msgDestroy, dvDesire.ink, pNull);    // destroy new, empty ink object
            pInst->ink = objNull;
            dataSet.ink = dvDesire.originalInk;
            OPostU32(msgDestroy, pInst->tTranslator, pNull);
            pInst->initialTarget = objNull;          // clear initial target
        }
        /* translate it and send the text */
        if (targetObject == pInst->initialTarget)
        {
            Dbg1(Debugf("Using initialTarget"));
            inkTranslate.translator = pInst->tTranslator;
            inkTranslate.translateType = INK_TRANSLATE_FINISH;
        }
        else
        {
            Dbg1(Debugf("Not using initialTarget: using new target"));
            if (pInst->initialTarget != objNull)
            {
                OCall(msgRemoveObserver, pInst->ink, pInst->tTranslator);
                OPostU32(msgDestroy, pInst->tTranslator, pNull);
            }
            pInst->tTranslator = objNull;
            OCallNo(msgDvCreateTranslator, targetObject, &pInst->tTranslator);
            inkTranslate.translator = pInst->tTranslator;
            inkTranslate.translateType = INK_TRANSLATE_ALL;
        }
        inkTranslate.window = self;
        inkTranslate.client = targetObject;
        if (inkTranslate.translator != objNull)
        {
            OCallJmp(msgInkTranslate, dataSet.ink, &inkTranslate, ERROR2);
            x2String.count = 2047;
            x2String.pString = text;

XList2Text(inkTranslate.pXList);                    // translate to text
            XList2String(inkTranslate.pXList, &x2String);       // extract string
            XListFree(inkTranslate.pXList);                     // free up the heap space
            Dbg3(Debugf("Translated String = \"%s\"", text));
            s = OCall(msgDvDataSet, targetObject, &dataSet);
        }
ERROR2:
        if (s != stsOK)
        {
            OPostU32(msgDestroy, pInst->ink, pNull);    // destroy the ink
        }
        pInst->ink = objNull;
    }
```

```
    else        // DV_DESIRE_NONE
        {
ERROR3:
        OPostU32(msgDestroy, pInst->ink, pNull);    // destroy the ink
        pInst->ink = objNull;
        }
    return(stsOK);
    }                           // end of FvDispatchInk
/*----------------------------------------------------------------------
** FvOutProxCleanUp
**--------------------------------------------------------------------*/
void LOCAL FvOutProxCleanUp(P_FV_INST pInst)
    {
    if (pInst->tTranslator != objNull)
        {
        OPostU32(msgDestroy, pInst->tTranslator, pNull);    // destroy the translator
        pInst->tTranslator = objNull;
        } if (pInst->gTranslator != objNull)
        {
        OPostU32(msgDestroy, pInst->gTranslator, pNull);    // destroy the translator
        pInst->gTranslator = objNull;
        }
    pInst->initialTarget = objNull;
    pInst->numStrokes = 0;
    }                           // end of FvOutProxCleanUp
/*----------------------------------------------------------------------
** FvCreateGTranslator
**--------------------------------------------------------------------*/
STATUS LOCAL FvCreateGTranslator(P_FV_INST pInst)
    {
    if (pInst->gTranslator == objNull)
        {
        return(CreateDefaultObject(clsXGesture, &pInst->gTranslator));
        }
    return(stsOK);
    }                           // end of FvCreateGTranslator
/*----------------------------------------------------------------------
** FvGetInkSplit
**--------------------------------------------------------------------*/
void LOCAL FvGetInkSplit(U16 inkProcessCnt, P_FV_INST pInst)
    {
    pInst->ink = pInst->inkArray[inkProcessCnt].ink;
    pInst->numStrokes = pInst->inkArray[inkProcessCnt].numStrokes;
    pInst->initialTarget = pInst->inkArray[inkProcessCnt].initialTarget;
    pInst->gTranslator = pInst->inkArray[inkProcessCnt].gTranslator;
    pInst->tTranslator = pInst->inkArray[inkProcessCnt].tTranslator;
    return;
    }                           // end of FvGetInkSplit
/*----------------------------------------------------------------------
** FvPenHoldTimeout
**--------------------------------------------------------------------*/
STATUS LOCAL FvPenHoldTimeout(OBJECT self, P_INPUT_EVENT pArgs, P_INST pData)
    {
    P_FV_INST       pInst;
    U16             numTargets;
    TARGET_INFO     pTargets[MAX_TARGETS];
    RECT32          rect;
    BOOLEAN         moveCopyOk;

pInst = pData->pInst;

/* don't allow a hold when we've already done strokes */
    if (((P_PEN_DATA)pArgs->eventData)->taps == 0)
        {
        if ((pInst->inkCnt != 0) || (pInst->numStrokes != 0))
            {
            return(stsInputGrabTerminate);
            }
        }
    else if (((P_PEN_DATA)pArgs->eventData)->taps == 1)
        {
        if ((pInst->inkCnt != 0) || (pInst->numStrokes > 1))
            {
            return(stsInputGrabTerminate);
            }
        }
    else
        {
        return(stsInputGrabTerminate);
        }
    OCall(msgInkClear, pInst->ink, argNull);    // clear all prior strokes
    pInst->numStrokes = 0;                      // clear the stroke cnt
```

```
        rect.size.w = rect.size.h = 0x10000;
        rect.origin = pArgs->xy;
        OCall(msgSdcLWCtoINTL_XY32, pData->dc, &rect.origin);
        FvTargetByArea(pData->pDvList, &rect, pTargets, MAX_TARGETS, &numTargets, fvAllEvents);
        if (numTargets != 0)
        {
            if (((P_PEN_DATA)pArgs->eventData)->taps == 0)
            {
                OCall(msgDvInputMoveFromOk, pTargets[0].targetObject, &moveCopyOk);
                if (moveCopyOk)
                {
                    pInst->selection = pTargets[0].targetObject;
//                  OCall(msgSelSelect, self, argNull);      // set the selection
                    OCall(msgSelBeginMove, self, argNull);
                }
            }
            else        // more than one tap, must be copy
            {
//              pInst->state.ignoreNextStroke = TRUE;
                OCall(msgDvInputCopyFromOk, pTargets[0].targetObject, &moveCopyOk);
                if (moveCopyOk)
                {
                    pInst->selection = pTargets[0].targetObject;
//                  OCall(msgSelSelect, self, pNull);        // set the selection
                    OCall(msgSelBeginCopy, self, pNull);
                }
            }
            return(stsInputTerminate);
        }
        return(stsInputGrabTerminate);
}                                       // end of FvPenHoldTimeout
#ifdef DEBUG
/*-------------------------------------------------------------------------
** FvLog
**-----------------------------------------------------------------------*/
STATUS LOCAL FvLog(P_INPUT_EVENT pArgs, P_INST pData)
{
    P_PEN_STROKE    pStroke;
    P_FV_INST       pInst;

pInst = pData->pInst;
    if (pInst->fileHandle == pNull)
    {
        pInst->fileHandle = fopen("penapps.log", "ab");
    }
    switch(pArgs->devCode)
    {
        case msgPenStroke:
        {
            fwrite(pArgs, sizeof(INPUT_EVENT), 1, pInst->fileHandle);
            fwrite((P_PEN_DATA)pArgs->eventData, sizeof(PEN_DATA), 1, pInst->fileHandle);
            pStroke = (P_PEN_STROKE)((P_PEN_DATA)(pArgs->eventData))->data;
//          Debugf("FvLog       x:%u, y:%u, w:%u, h:%u, cnt:%u, len:%u, pt[len-1]:%u", \
//              pStroke->bounds.origin.x, pStroke->bounds.origin.y, \
//              pStroke->bounds.size.w, pStroke->bounds.size.h, \
//              pStroke->count, (U16)pStroke->info.len, (U16)pStroke->data[pStroke->info.len-1]);
            fwrite(pStroke, sizeof(PEN_STROKE) + pStroke->info.len , 1, pInst->fileHandle);

break;
        }
        case msgPenUp:
        case msgPenDown:
        case msgPenOutProxUp:
        case msgPenOutProxDown:
        case msgPenHoldTimeout:
        {
            fwrite(pArgs, sizeof(INPUT_EVENT), 1, pInst->fileHandle);
            break;
        }
    }
    return(stsOK);
}                               // end of FvLog endif
/*-------------------------------------------------------------------------
** FvPenDispatch
**-----------------------------------------------------------------------*/
STATUS LOCAL FvPenDispatch(OBJECT self, P_INPUT_EVENT pArgs, P_INST pData, U16 fvEventFlags)
{
    STATUS          s;
    P_FV_INST       pInst;
    U16             numTargets;
    TARGET_INFO     pTargets[1];
    RECT32          downPt;
    DVINPUT_EVENT   dvInputEvent;
    BOOLEAN         eventSent = FALSE;
```

```
    pInst = pData->pInst;

/* if no grabber yet and no initial target yet,
    ** check for a grabber.
    */
    if (pInst->grabber != objNull)
    {
        dvInputEvent.pInputEvent = pArgs;              // ptr to the input event
        dvInputEvent.inkObject = pInst->ink;           // pass the current ink object
        dvInputEvent.origin = pArgs->xy;
        OCall(msgSdcLWCtoINTL_XY32, pData->dc, &dvInputEvent.origin);
        s = OCall(msgDvInputEvent, pInst->grabber, &dvInputEvent);
        if (s < stsOK)
        {
            // allow debugger to break here
            Debugf(" ");
        }
        eventSent = TRUE;
    }
    else if (pInst->initialTarget == objNull)
    {
        downPt.origin = pArgs->xy;
        OCall(msgSdcLWCtoINTL_XY32, pData->dc, &downPt.origin);
        downPt.size.w = downPt.size.h = 0x10000;
        FvTargetByArea(pData->pDvList, &downPt, pTargets, 1, &numTargets, fvEventFlags);
        if (numTargets == 1)
        {
            dvInputEvent.pInputEvent = pArgs;              // ptr to the input event
            dvInputEvent.origin = downPt.origin;           // location of this event
            dvInputEvent.inkObject = pInst->ink;           // pass the current ink object
            s = OCall(msgDvInputEvent, pTargets[0].targetObject, &dvInputEvent);
            OCall(msgFvSetFocus, self, pTargets[0].targetObject);
            eventSent = TRUE;
        }
    } if (eventSent)
    {
        switch(s)
        {
            case stsDvInputBeginGrab:
            {
                pInst->grabber = pTargets[0].targetObject;
                break;
            }
            case stsDvInputTerminateAndForward:
            case stsDvInputTerminateGrab:
            {
                pInst->grabber = objNull;
                pInst->initialTarget = objNull;
                break;
            }
            case stsDvInputIgnore:
            case stsDvInputContinue:
            case stsOK:
            default:
            {
                break;
            }
        }
    }
    return(stsInputGrabTerminate);
}                        // end of FvPenDispatch
```

```
typedef enum
{
    PREFER_NEITHER = 0,
    PREFER_LEFT = 1,
    PREFER_RIGHT = 2
} LEFT_RIGHT_PREFERENCE;

typedef enum
{
    PREFER_UP = 1,
    PREFER_DOWN = 2
} UP_DOWN_PREFERENCE;

typedef enum
{
    PRIMARY_NEITHER = 0,      // defaults to up/down
    PRIMARY_LEFT_RIGHT = 1,   // use left/right first
    PRIMARY_UP_DOWN = 2,      // use up/down
} PRIMARY_PREFERENCE;

typedef struct
{
    MESSAGE gesture;
    U8      primaryPref:    2,    // which preference is more important
            leftRightPref:  2,    // prefer left or right ?
            upDownPref:     2,    // prefer up or down ?
            reserved:       2;    // extra bits
} GESTURE_PREF, FAR *P_GESTURE_PREF;

/* These are preference directions for gestures when resolving targeting */
/* ties between fields. */
GESTURE_PREF gesturePreferences[] =
    { // gesture        directional pref    left/right       up/down
      {xgsCross,        PRIMARY_NEITHER,    PREFER_NEITHER,  PREFER_NEITHER},
      {xgsUpCaret,      PRIMARY_UP_DOWN,    PREFER_NEITHER,  PREFER_UP},
      {xgsPigtailVert,  PRIMARY_UP_DOWN,    PREFER_LEFT,     PREFER_DOWN},
      {xgsCheck,        PRIMARY_UP_DOWN,    PREFER_RIGHT,    PREFER_DOWN},
      {0}
    };
```

```
/*------------------------------------------------------------------
** FVTryGesture returns stsOK if it was processed as a gesture otherwise
** returns stsFailed.
**-----------------------------------------------------------------*/
STATUS LOCAL FVTryGesture(OBJECT self, P_TARGET_INFO pTargets, P_FV_INST pInst, P_INST pData)
{
    STATUS          s;
    DVINPUT_GESTURE dvGesture;
    INK_TRANSLATE   inkTranslate;
    U16             numTargets;
    RECT32          hotPointBounds;
    X2GESTURE       x2Gesture, osGesture;
    P_GESTURE_PREF  pGesturePref;
    OBJECT          targetObject;
    STATUS          gStatus;
    RECT32          strokeBounds;

gStatus = stsFailed;                        // assume gesture not processed
    x2Gesture.msg = xgsNull;                    // init to null
    if (pInst->numStrokes < MAX_GESTURE_STROKES) // if could be a gesture
    {
        /* translate the gesture */
        if (pInst->gTranslator != objNull)
        {
            inkTranslate.translateType = INK_TRANSLATE_FINISH; // just the rest of the strokes
        }
        else    // create it and send all the strokes
        {
            WarnJmp(FVCreateGTranslator(pInst), ERROR1);  // create gesture translator
            inkTranslate.translateType = INK_TRANSLATE_ALL;  // all strokes
        }
        inkTranslate.translator = pInst->gTranslator;
        inkTranslate.window = self;
        inkTranslate.client = objNull;
        OCallJmp(msgInkTranslate, pInst->ink, &inkTranslate, ERROR1);  // translate gesture /* now turn the xlist into a gesture */
        XList2Gesture(inkTranslate.pXList, &x2Gesture);
        XListFree(inkTranslate.pXList);         // free up the heap space
ERROR1:
        if (x2Gesture.msg == xgsNull)           // if didn't translate as a gesture
        {
            return(stsFailed);                  // return error
        }
        osGesture = x2Gesture;
        /* convert hotpoint units to INTL */
        OCall(msgInkGetBoundsINTL, pInst->ink, &strokeBounds);  // get INTL bounds
        PENtoINTL4_XY32(&x2Gesture.hotPoint, pInst->windowHeight);

Dbg0(DrawHotPoint(self, x2Gesture, pData));

/* now target the gesture to a field */
        hotPointBounds.origin = x2Gesture.hotPoint;
        hotPointBounds.size.w = hotPointBounds.size.h = BrMakeFixed(1.0);
        dvGesture.gesture = x2Gesture.msg;
        dvGesture.hotPoint = x2Gesture.hotPoint;
        dvGesture.bounds = strokeBounds;
        dvGesture.pExtra = pNull;

/* check for overlap with fields, return list of overlapped fiels in pTargets */
        FvTargetByArea(pData->pDvList, &hotPointBounds, pTargets, MAX_TARGETS, &numTargets, fvAllEvents);

targetObject = objNull;

/* if no overlap, treat it as a form gesture */
        if (numTargets == 0)
        {
            /* convert from 1st quadrant pen units to 1st quadrant device units */
            PENtoLWC_SIZE32((P_SIZE32)&osGesture.bounds.origin);
            PENtoLWC_SIZE32((P_SIZE32)&osGesture.bounds.size);
            PENtoLWC_SIZE32((P_SIZE32)&osGesture.hotPoint);
            gStatus = OCall(msgFvGesture, self, &osGesture);
        }

/* one unique target */
        else if (numTargets == 1)
        {
            gStatus = OCall(msgDvInputGesture, pTargets[0].targetObject, &dvGesture);
            targetObject = pTargets[0].targetObject;
        }

/* multiple targets */
        else    // numTargets > 1
        {
            Dbg1(Debugf("Multiple targets on gesture targeting"));

/* look through the whole table */
            for (pGesturePref = gesturePreferences; pGesturePref->gesture != 0; ++pGesturePref)
            {
                if (pGesturePref->gesture == dvGesture.gesture)    // if gesture matches
```

```
            {
            /* if preferred direction = left/right */
            if (pGesturePref->primaryPref == PRIMARY_LEFT_RIGHT)
                {
                targetObject = FindPreference(&dvGesture.hotPoint,
                    PRIMARY_LEFT_RIGHT, pGesturePref->leftRightPref,
                    pTargets, numTargets);
                if (targetObject == objNull)    // if still tied, try up/down
                    {
                    targetObject = FindPreference(&dvGesture.hotPoint,
                        PRIMARY_UP_DOWN, pGesturePref->upDownPref,
                        pTargets, numTargets);
                    }
                }

/* preferred direction = up/down */
            else if (pGesturePref->primaryPref == PRIMARY_UP_DOWN)
                {
                targetObject = FindPreference(&dvGesture.hotPoint,
                    PRIMARY_UP_DOWN, pGesturePref->upDownPref,
                    pTargets, numTargets);
                if (targetObject == objNull)    // if still tied, try right/left
                    {
                    targetObject = FindPreference(&dvGesture.hotPoint,
                        PRIMARY_LEFT_RIGHT, pGesturePref->leftRightPref,
                        pTargets, numTargets);
                    }
                }

/* no direction preferred */
            else    // default, no directional preference
                {
                // targetObject remains null
                Dbgl(Debugf("No Preference: Ambigious: No target Resulted"));
                targetObject = objNull;
                }
            if (targetObject != objNull)
                {
                gStatus = OCall(msgDvInputGesture, targetObject, &dvGesture);
                }
            break;
            }
        }
    if (targetObject != objNull)
        {
        pInst->selection = targetObject;
        OCall(msgSelSelect, self, argNull);     // reset set the selection
        }
    }
return(gStatus);
}                   // end of FvTryGesture
```

```
/*-------------------------------------------------------------
** FindPreference tests the array of overlapped fields against the
** preferred directions, to find the overlapped field with the greatest
** preference.
**-------------------------------------------------------------*/
#define PREFERENCE_MARGIN 0x50000

OBJECT LOCAL FindPreference(P_XY32 pHotPoint, U16 direction,
        U16 preferredDirection, P_TARGET_INFO pTargets, U16 numTargets)
{
    RECT32  testRect;
    U16     index;
    U32     highestOverlap, currentOverlap;
    OBJECT  targetObject;

/* build a test rect around the hotpoint */
    testRect.origin.x = pHotPoint->x - PREFERENCE_MARGIN;
    testRect.origin.y = pHotPoint->y - PREFERENCE_MARGIN;
    testRect.size.h = 2 * PREFERENCE_MARGIN;
    testRect.size.w = 2 * PREFERENCE_MARGIN;

/* now, skew the test rect in the preferred direction */
    if (direction == PRIMARY_LEFT_RIGHT)
    {
        Dbg1(Debugf("Direction = Left/Right"));
        if (preferredDirection == PREFER_LEFT)
        {
            Dbg1(Debugf("Prefer Left"));
            testRect.origin.x -= PREFERENCE_MARGIN; // skew rect to the left
        }
        else if (preferredDirection == PREFER_RIGHT)
        {
            Dbg1(Debugf("Prefer Right"));
            testRect.origin.x += PREFERENCE_MARGIN; // skew rect to the right
        }
        else
        {
            return(objNull);
        }
    }
    else if (direction == PRIMARY_UP_DOWN)
    {
        Dbg1(Debugf("Direction = Up/Down"));
        if (preferredDirection == PREFER_UP)
        {
            Dbg1(Debugf("Prefer Up"));
            testRect.origin.y -= PREFERENCE_MARGIN; // skew rect up
        }
        else if (preferredDirection == PREFER_DOWN)
        {
            Dbg1(Debugf("Prefer Down"));
            testRect.origin.y += PREFERENCE_MARGIN; // skew rect down
        }
        else
        {
            return(objNull);
        }
    }
    else        // no preferred direction
    {
        return(objNull);
    }
    /* testRect is now a rect that should be tested for max overlap */
    /* with every overlapped field, return the field with the highest overlap */
    targetObject = objNull;           // init
    highestOverlap = 0;               // init
    for (index = 0; index < numTargets; ++index)
    {
        currentOverlap = Rect32OverlapArea(&pTargets[index].targetBounds, &testRect);
        if (currentOverlap > highestOverlap)
        {
            Dbg1(Debugf("Overlap = %lu", currentOverlap));
            highestOverlap = currentOverlap;
            targetObject = pTargets[index].targetObject;
        }
    }
    Dbg1(Debugf("Found Target"));
    return(targetObject);
}                   // end of FindPreference
```

RECEIVED

94 JUL 12 PM 3: 26

GROUP 260

```
/*------------------------------------------------------------------
** DvDesireText returns whether or not the dataview wants some text.
**-----------------------------------------------------------------*/
MsgHandlerWithTypes(DvDesireText, P_DV_DESIRE, P_DVI)
{
    P_DV_INST       pInst;
    DVLABEL_METRICS labelMetrics;

pInst = pData->pInst;
    pArgs->originalInk = objNull;          // assume no append
    pArgs->appendStatus = FALSE;           // assume no append
    if (pInst->hwxStyle.signature == TRUE)
    {
        /* always append on signature */
        OCall(msgDvLabelGetMetrics, self, &labelMetrics);
        if (labelMetrics.ink != objNull)
        {
            pArgs->originalInk = labelMetrics.ink;
            pArgs->appendStatus = TRUE;
        }
        pArgs->desireStatus = DV_DESIRE_INK;
    }
    else if (pInst->hwxStyle.deferred == TRUE)
    {
        OCall(msgDvLabelGetMetrics, self, &labelMetrics);
        if (labelMetrics.ink != objNull)
        {
            pArgs->originalInk = labelMetrics.ink;
            /* check for append */
            if (DvAppendInkOk(pArgs->ink, labelMetrics.ink) == TRUE)
            {
                pArgs->appendStatus = TRUE;
            }
        }
        pArgs->desireStatus = DV_DESIRE_TEXT;
    }
    else    // just regular text
    {
        pArgs->desireStatus = DV_DESIRE_TEXT;
    }
    return(stsOK);

MsgHandlerParametersNoWarning;
}               // end of DvDesireText

/*------------------------------------------------------------------
** DvNewText
**-----------------------------------------------------------------*/
#define MIN_APPEND_SPACE    0x120000    // 0.25" (18/72nds) in INTL units
define MAX_APPEND_OVERLAP  0x120000    // 0.25" (18/72nds) in INTL units MsgHandlerWithTypes(DvNewText, P_DV_NEW_TEXT, P_DVI)
{
    STATUS                s;
    P_DV_INST             pInst;
    DVLABEL_INK_VISIBLE   inkVisible;
    DVLABEL_METRICS       labelMetrics;
    char                  newStr[DV_STR_MAXLENGTH];
    STR_METRICS           strMetrics;
    RECT32                inkRect;
    BOOLEAN               appendStatus, appendSpace;

pInst = pData->pInst;
    inkVisible.inkVisible = TRUE;
    inkVisible.drawAction = DVLABEL_INK_DRAW;
    if (pInst->hwxStyle.signature)
    {
        OCallRet(msgDvLabelSetInk, self, pArgs->inkObject);
        OCallRet(msgDvLabelInkVisible, self, &inkVisible);
    }
    else if (pInst->hwxStyle.deferred)
    {
        OCallRet(msgDvLabelSetInk, self, pArgs->inkObject);
        OCallRet(msgDvLabelInkVisible, self, &inkVisible);
        OCall(msgDvLabelSetString, self, pArgs->pStr);
    }
    else if (pInst->state.segmented)
    {
        strcpy(newStr, pArgs->pStr);                            // get local copy
        DvSetBoxMemory(newStr, pInst);                          // do box memory stuff
        OCall(msgDvLabelMergeString, self, newStr);             // get the merged string
        OCall(msgDvSetString, self, newStr);                    // set the whole string
    }
    else    // regular text
```

```
DV_GESTURE  dvGesture;

pInst = pData1->pInst;
if (pInst->state.segmented)
    {
    /* do our own gesture processing here */
    s = DvEvalSegGesture(pInst, pArgs, &dvGesture);
    if (s == stsOK)
        {
        dvGesture.pExtra = pNull;
        dvGesture.bounds.size.h = dvGesture.bounds.size.w = 0x10000;
        return(OCall(msgDvGesture, self, &dvGesture));
        }
    )
return(stsDvNoDispatch);

MsgHandlerParametersNoWarning;
)                   // end of DvInkRaw

/*---------------------------------------------------------------------
** DvSetBoxMemory implements box memory.
**-------------------------------------------------------------------*/

STATUS LOCAL DvSetBoxMemory(P_STRING pNewStr, P_DV_INST pInst)
    {
    STATUS          s;
    P_DV_BOX_INFO   pBoxInfo;
    U16             index;

if (pInst->hwxStyle.boxMemoryEnabled)
        {
        /* find out if there is one and only one character returned here */
        /* if so, we want to implement box memory */
        index = strspn(pNewStr, ' ');   // find first non blank char
        if (index < strlen(pNewStr))    // only proceed if there was a non-blank char
            {
            pBoxInfo = pInst->pBoxInfo;     // get this locally
            /* only do box memory if there's nothing else but spaces */
            if (strspn(pNewStr+index+1, ' ') >= strlen(pNewStr+index+1))
                {
                /* here we know we want to do box memory */
                /* if no pBoxInfo, allocate it */
                if (pBoxInfo == pNull)
                    {
                    WarnRet(OSHeapBlockAlloc(osProcessHeapId, SizeOf(DV_BOX_INFO), &pInst->pBoxI:
                    pBoxInfo = pInst->pBoxInfo;     // get this locally
                    pBoxInfo->chars[0] = 0;
                    }
                /* if different position, clear the string */
                else if (index != pBoxInfo->pos)
                    {
                    pBoxInfo->chars[0] = 0;
                    }
                pBoxInfo->pos = index;
                /* if max chars already, remove oldest char */
                if (strlen(pBoxInfo->chars) >= DV_MAX_BOX_MEMORY_CHARS)
                    {
                    RemoveChar(pBoxInfo->chars, 0); // kill oldest char
                    }
                AppendChar(pBoxInfo->chars, pNewStr[index]);
                }
            else
                {
                if (pBoxInfo != pNull)
                    {
                    OSHeapBlockFree(pBoxInfo);
                    pInst->pBoxInfo = pNull;
                    }
                }
            }
        }
    else
        {
        if (pBoxInfo != pNull)
            {
            OSHeapBlockFree(pBoxInfo);
            pInst->pBoxInfo = pNull;
            }
        }
    return(stsOK);
    }                   // end of DvSetBoxMemory /*---------------------------------------------------------------------
** DvAppendInkOk returns TRUE if it's OK to append the new ink
** onto the old ink.
```

```
{
/* CHECK FOR APPEND
**
** The rules are:
** If no overlap, append.
** If overlap < MAX_APPPEND_OVERLAP, append.
** If appending and distance > MIN_APPEND_SPACE, append a space.
*/
appendStatus = FALSE;        // init
appendSpace = FALSE;         // init
OCall(msgDvLabelGetMetrics, self, &labelMetrics);
OCall(msgInkGetBoundsINTL, pArgs->inkObject, &inkRect);

/* don't append if the string is empty */
if (labelMetrics.boundRect.size.w != 0)
    {
    if (RectJ2sIntersect(&labelMetrics.boundRect, &inkRect))
        {
        if ((inkRect.origin.x > labelMetrics.boundRect.origin.x) && \
            (RightEdge(labelMetrics.boundRect) - inkRect.origin.x < MAX_APPEND_OVERLAP))
            {
            appendStatus = TRUE;
            }
        }
    else    // no overlap
        {
        appendStatus = TRUE;

/* figure out whether or not to put a space in here based on the
        ** distance from the text
        */
        if (inkRect.origin.x - RightEdge(labelMetrics.boundRect) > MIN_APPEND_SPACE)
            {
            appendSpace = TRUE;
            }
        }
    }
if (appendStatus)
    {
    /* append here */
    strMetrics.pStr = newStr;
    strMetrics.bufLen = DV_STR_MAXLENGTH;
    OCall(msgDvLabelGetString, self, &strMetrics);

if (appendSpace == TRUE)
        {
        strcat(newStr, " ");        // insert a space
        }
    strcat(newStr, pArgs->pStr);
    s = OCall(msgDvSetString, self, &newStr);
    }
else    // replace because it's overwrite
    {
    if ((pInst->hwxStyle.xlateErrAction == dvXlateErrDefer) && \
        (strchr(pArgs->pStr, MEATBALL_CHAR) != pNull))
        {
        OCallRet(msgDvLabelSetInk, self, pArgs->inkObject);
        OCallRet(msgDvLabelInkVisible, self, &inkVisible);
        s = OCall(msgDvLabelSetString, self, pArgs->pStr);
        }
    else
        {
        s = OCall(msgDvSetString, self, pArgs->pStr);
        }
    }
if (s == stsOK)
    {
    OCall(msgWinUpdate, pInst->manager, pNull);    // force repaint
    ObjectPostU32(msgDestroy, pArgs->inkObject, pNull);
    }
return(s);
}
return(stsOK);

MsgHandlerParametersNoWarning;
}               // end of DvNewText
/*-------------------------------------------------------------------
** DvInkRaw
**-----------------------------------------------------------------*/
MsgHandlerWithTypes(DvInkRaw, OBJECT, P_DVI)
{
STATUS      s;
P_DV_INST   pInst;
```

```
/* ........................................................... */
BOOLEAN LOCAL DvAppendInkOk(OBJECT newInk, OBJECT oldInk)
    {
    STATUS        s;
    RECT32        oldBounds;
    INK_OVERLAP   inkOverlap;

/* now compare bounds */
    OCallJmp(msgInkGetBoundsINTL, oldInk, &oldBounds, ERROR);
    inkOverlap.pRect = &oldBounds;
    OCallJmp(msgInkCheckOverlap, newInk, &inkOverlap, ERROR);
    if (inkOverlap.overlapType != INK_OVERLAP_STROKE)
        {
        return(TRUE);
        }
ERROR:
    return(FALSE);
    }                    // end of DvAppendInkOk
```

I claim:

1. A device for locating a target field for a block of data formed by one or more strokes, comprising:
    a display for receiving input of said strokes, said display having a plurality of fields for being associated with said block of data, each of said plurality of fields having an associated field perimeter;
    a data entering device for entering said strokes on said display;
    a block identifier coupled to said display for identifying said block of data by comparing displacement between each of said strokes and associating at least one of said strokes with said block of data;
    a boundary generator coupled to said block identifier for generating a boundary around said block of data; and
    a target identifier for identifying one of said plurality of fields as said target field to be associated with said block of data by comparing overlap between said boundary of said block of data and said field perimeters of at least two of said plurality of fields.

2. The device of claim 1 wherein said display comprises a display of a computer system.

3. The device of claim 1 wherein said display is a pen sensitive display of a computer system.

4. The device of claim 1 wherein said data entering device comprises a pen.

5. The device of claim 1 wherein said data is comprised of one or more strokes.

6. The device of claim 5 wherein said block identifier can determine X displacement and Y displacement of a current stroke from a previous stroke.

7. The device of claim 6 wherein said boundary around said block of data comprises an origin having coordinates $X_C$, $Y_C$, a width $w_C$, and a height $h_C$.

8. The device of claim 7 wherein said target identifier identifies said target field as a field overlapped by at least a first percentage of area of said boundary of said block of data.

9. The device of claim 8 wherein said first percentage comprises 70%.

10. The device of claim 5 further including a stroke boundary generator for generating a stroke boundary around each of said strokes.

11. The device of claim 10 wherein said target identifier identifies one of said plurality of fields as said target field based on a comparison of overlap between said stroke boundaries of said strokes and said field perimeters of said plurality of fields.

12. A method for locating a target field for a block of data formed by one or more strokes, comprising the steps of:
    providing a display for receiving input of said strokes;
    providing a plurality of fields on said display for being associated with said block of data, each of said plurality of fields having an associated field perimeter;
    entering said strokes onto said display;
    identifying said block of data by comparing displacement between each of said strokes and associating at least one of said strokes with said block of data;
    generating a block boundary around said block of data;
    generating a comparison result by comparing overlap between said block boundary and said field perimeters of at least two of said plurality of fields; and
    identifying one of said at least two of said plurality of fields as said target field to be associated with said block of data based on said comparison result.

13. The method of claim 12 wherein said step of providing a display comprises providing a display of a computer system.

14. The method of claim 12 wherein said step of providing a display comprises providing a pen sensitive display of a computer system.

15. The method of claim 12 wherein said step of entering said strokes comprises entering said strokes with a pen.

16. The method of claim 12 wherein said step of identifying said block of data comprises determining X displacement and Y displacement of a current stroke from a previous stroke.

17. The method of claim 16 wherein said block boundary comprises an origin having coordinates $X_C$, $Y_C$, a width $w_C$, and a height $h_C$.

18. The method of claim 17 wherein said target field is defined as a field overlapped by at least a first percentage of area of said block boundary.

19. The method of claim 18 wherein said first percentage comprises 70%.

20. The method of claim 19 further including the steps of:
    generating a stroke boundary around each of said strokes; and
    identifying one of said at least two of said plurality of fields as said target field by comparing overlap between said stroke boundaries of said strokes and said field perimeters of said plurality of fields.

21. A device for processing one or more strokes as a block of data comprising:
    a display for receiving input of and for displaying said strokes;
    a data entering device for entering said strokes on said display; and
    a block identifier for identifying said block of data by determining X displacement and Y displacement of a current stroke from a previous stroke, by generating a boundary around said current stroke, and by comparing said boundary around said current stroke against a target of said previous stroke.

22. The device of claim 21 wherein said block identifier splits said current stroke from said previous stroke when there is at least a predetermined X displacement between said current stroke and said previous stroke.

23. The device of claim 22 wherein said predetermined X displacement is approximately 0.50 inches.

24. The device of claim 21 wherein said block identifier splits said current stroke from said previous stroke when there is at least a predetermined X displacement between said current stroke and said previous stroke and said boundary of said current stroke has an area more than 50% of which is contained in a target different than said target of said previous stroke.

25. The device of claim 21 wherein said block identifier splits said current stroke from said previous stroke when there is at least a predetermined Y displacement between said current stroke and said previous stroke.

26. The device of claim 25 wherein said predetermined Y displacement is approximately 0.15 inches.

27. The device of claim 21 wherein said block identifier further generates a Y center displacement between a center of said current stroke and a center of said previous stroke.

28. The device of claim 27 wherein said block identifier splits said current stroke from said previous stroke when said Y displacement is at least a predetermined value, said Y center displacement is at least a predetermined value, and said current stroke is not contained by an upper and lower bound of said previous stroke.

29. The device of claim 28 wherein said Y center displacement is approximately 0.25 inches.

30. The device of claim 27 wherein said block identifier splits said current stroke from said previous stroke when said Y displacement is at least a predetermined value, said Y center displacement is at least a predetermined value, said current stroke is not contained by an upper and lower bound of said previous stroke, and said boundary of said current stroke has an area more than 50% of which is contained in a target different than said target of said previous stroke.

31. The device of claim 21 wherein said display comprises a display of a computer system.

32. The device of claim 21 wherein said display is a pen sensitive display of a computer system.

33. The device of claim 21 wherein said data entering device comprises a pen.

34. The device of claim 21 wherein said data is comprised of one or more strokes.

35. A method for processing one or more strokes as a block of data comprising the steps of:

providing a display for receiving input of said strokes;

entering said strokes onto said display;

identifying said block of said data by determining X displacement and Y displacement of a current stroke from a previous stroke, by generating a boundary around said current stroke, and by comparing said boundary around said current stroke against a target of said previous stroke.

36. The method of claim 35 wherein said current stroke is split from said previous stroke when there is at least a predetermined X displacement between said current stroke and said previous stroke.

37. The method of claim 36 wherein said predetermined X displacement is approximately 0.50 inches.

38. The method of claim 35 wherein said current stroke is split from said previous stroke when there is at least a predetermined X displacement between said current stroke and said previous stroke and said boundary of said current stroke has an area more than 50% of which is in a target different than said target of said previous stroke.

39. The method of claim 35 wherein said current stroke is split from said previous stroke when there is at least a predetermined Y displacement between said current stroke and said previous stroke.

40. The method of claim 39 wherein said predetermined Y displacement is approximately 0.15 inches.

41. The method of claim 35 further including the step of generating a Y center displacement between a center of said current stroke and a center of said previous stroke.

42. The method of claim 41 wherein said current stroke is split from said previous stroke when said Y displacement is at least a predetermined value, said Y center displacement is at least a predetermined value, and said current stroke is not contained by an upper and lower bound of said previous stroke.

43. The method of claim 42 wherein said predetermined value of said Y center displacement is approximately 0.25 inches.

44. The method of claim 41 wherein said current stroke is split from said previous stroke when said Y displacement is at least a predetermined value, said Y center displacement is at least a predetermined value, said current stroke is not contained by an upper and lower bound of said previous stroke, and said boundary of said current stroke has an area more than 50% of which is in a target different than said target of said previous stroke.

45. The method of claim 35 wherein said step of providing a display comprises providing a display of a computer system.

46. The method of claim 35 wherein said step of providing display comprises providing a pen sensitive display of a computer system.

47. The method of claim 35 wherein said step of entering data comprises entering data with a pen.

* * * * *

UNITED STATES PATENT AND TRADEMARK OFFICE
CERTIFICATE OF CORRECTION

PATENT NO. : 5,652,806
DATED : July 29, 1997
INVENTOR(S) : John Friend

It is certified that error appears in the above-identified patent and that said Letters Patent is hereby corrected as shown below:

Column 3, line 30, delete "is";

Column 4, line 25, change "are" to --art--;

Column 4, line 56, insert --.-- after "targeting";

Column 8, line 15, change "is" to --are--;

Column 9, line 59, change "define" to --defines--;

Column 10, line 8, delete "is made.";

Column 12, line 26, change "$(Y_c+h_c)$" to --$((Y_c+h_c)$--;

Column 14, line 19, change "$(w_c)/2);$" to --$(w_c/2));$-- and "$(h_c)/2)$" to --$(h_c/2))$--;

Column 14, line 44, change "derision" to --decision--; and

Column 14, line 48, change "derision" to --decision--.

Signed and Sealed this

Tenth Day of April, 2001

Attest:

NICHOLAS P. GODICI

*Attesting Officer*   Acting Director of the United States Patent and Trademark Office